United States Patent
Prasad et al.

(10) Patent No.: US 12,132,532 B2
(45) Date of Patent: Oct. 29, 2024

(54) INTERFERENCE RANDOMIZATION IN RIS ASSISTED COMMUNICATIONS

(71) Applicant: QUALCOMM Incorporated, San Diego, CA (US)

(72) Inventors: Narayan Prasad, Westfield, NJ (US); Yu-Chin Ou, San Diego, CA (US); Yavuz Yapici, Florham Park, NJ (US); Mohammad Ali Tassoudji, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 19 days.

(21) Appl. No.: 18/193,525

(22) Filed: Mar. 30, 2023

(65) Prior Publication Data
US 2024/0333341 A1    Oct. 3, 2024

(51) Int. Cl.
*H04B 7/04* (2017.01)
*H04B 7/06* (2006.01)

(52) U.S. Cl.
CPC ....... *H04B 7/04026* (2023.05); *H04B 7/0606* (2013.01)

(58) Field of Classification Search
CPC ............................ H04B 7/04026; H04B 7/0606
See application file for complete search history.

(56) References Cited

U.S. PATENT DOCUMENTS

| | | |
|---|---|---|
| 2023/0087862 A1 | 3/2023 | Dai et al. |
| 2024/0080074 A1* | 3/2024 | Lee ................... H04B 7/04013 |
| 2024/0163850 A1* | 5/2024 | Elshafie .............. H04W 72/044 |

OTHER PUBLICATIONS

Nadeem Q-U-A., et al., "Opportunistic Beamforming Using an Intelligent Reflecting Surface without Instantaneous CSI", IEEE Wireless Communications Letters, IEEE, Piscataway, NJ, USA, vol. 10, No. 1, Sep. 11, 2020, pp. 1-6, XP011831200, ISSN: 2162-2337, Sep. 8, 2020, [retrieved on Jan. 9, 2021], Sections I-IV, pp. 146-149, figure 1.

Partial International Search Report—PCT/US2024/016363—ISA/EPO—May 28, 2024.

* cited by examiner

*Primary Examiner* — Sung S Ahn
(74) *Attorney, Agent, or Firm* — Patterson & Sheridan LLP

(57) ABSTRACT

Certain aspects of the present disclosure provide techniques for a method for wireless communication by a first wireless entity, comprising: receiving signaling from a second network entity to configure reconfigurable intelligent surface (RIS) elements based on a direction of a target incident signal and a direction of a target reflected signal, and configuring the RIS elements based on the direction of the target incident signal and the direction of the target reflected signal and to randomize reflections, based on the signaling.

30 Claims, 20 Drawing Sheets

3-bit per-element control

No randomization 2-bit per-element control

8-PSK (3-bit) intrinsic randomization alphabet 1-bit per-element control

8-PSK (3-bit) intrinsic randomization alphabet

Directivity Incident = 0°

No randomization

Directivity Incident = 0°

3-bit randomization
2-bit control

Directivity Incident = 0°

3-bit randomization
1-bit control

Directivity Incident = -15°

No randomization

Directivity Incident = -15°

3-bit randomization
2-bit control

Directivity Incident = -15°

3-bit randomization
1-bit control

Directivity Incident = -45°

No randomization

Directivity Incident = -45°

3-bit randomization
2-bit control

Directivity Incident = -45°

3-bit randomization
1-bit control

1700
A METHOD FOR WIRELESS COMMUNICATION BY A FIRST WIRELESS ENTITY
1702
RECEIVE SIGNALING FROM A SECOND NETWORK ENTITY TO CONFIGURE RECONFIGURABLE INTELLIGENT SURFACE (RIS) ELEMENTS BASED ON A DIRECTION OF A TARGET INCIDENT SIGNAL
1704
CONFIGURE THE RIS ELEMENTS BASED ON THE DIRECTION OF THE TARGET INCIDENT SIGNAL AND TO RANDOMIZE REFLECTIONS BASED ON THE SIGNALING
*FIG. 17*

1800

```
        ╭─────────────────────────────────────────╮
        │  A METHOD FOR WIRELESS COMMUNICATION BY A │
        │           SECOND WIRELESS ENTITY          │
        ╰─────────────────────────────────────────╯
                            │
                            ▼                          ┌─ 1802
┌─────────────────────────────────────────────────────────────┐
│ TRANSMIT SIGNALING TO A FIRST NETWORK ENTITY TO CONFIGURE   │
│ RECONFIGURABLE INTELLIGENT SURFACE (RIS) ELEMENTS, BASED ON │
│ A DIRECTION OF A TARGET INCIDENT SIGNAL, TO RANDOMIZE       │
│                        REFLECTIONS                          │
└─────────────────────────────────────────────────────────────┘
                            │
                            ▼                          ┌─ 1804
┌─────────────────────────────────────────────────────────────┐
│ COMMUNICATE WITH AT LEAST ONE USER EQUIPMENT (UE) VIA       │
│ SIGNALS TRANSMITTED IN THE DIRECTION OF THE TARGET INCIDENT │
│                          SIGNAL                             │
└─────────────────────────────────────────────────────────────┘
```

*FIG. 18*

INTERFERENCE RANDOMIZATION IN RIS ASSISTED COMMUNICATIONS

BACKGROUND

Field of the Disclosure

Aspects of the present disclosure relate to wireless communications, and more particularly, to techniques for managing interference in wireless network deployments with reconfigurable intelligent surface (RIS) assisted communications.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communication by a first network entity. The method includes receiving signaling from a second network entity to configure reconfigurable intelligent surface (RIS) elements based on a direction of a target incident signal. The method further includes configuring the RIS elements based on the direction of the target incident signal and to randomize reflections based on the signaling.

Another aspect provides a method for wireless communication by a second network entity. The method includes transmitting signaling to a first network entity to configure reconfigurable intelligent surface (RIS) elements, based on a direction of a target incident signal, to randomize reflections. The method further includes communicating with at least one user equipment (UE) via signals transmitted in the direction of the target incident signal.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIG. 17 depicts a method for wireless communications.

FIG. 18 depicts a method for wireless communications.

DETAILED DESCRIPTION

Aspects of the present disclosure provide apparatuses, methods, processing systems, and computer-readable mediums for interference randomization in reconfigurable intelligent surface (RIS) assisted communications.

In certain wireless systems, reconfigurable (or reflective) intelligent surfaces (RISs) may be deployed to reflect impinging beams/signals in desired directions. A RIS generally refers to a low-cost array of passive and reconfigurable reflecting elements that can extend coverage and boost spectral efficiency. A RIS may be configurable, via a RIS controller, to allow a network entity to enhance the visibility of an end-to-end channel for a target UE.

When an optimized RIS configuration reflects a target incident signal with enhanced gain along a desired reflect direction (or towards a particular desired focusing point), the RIS configuration may also result in relatively strong interference in additional undesired reflect directions. Additionally, non-target incident signals may also be reflected by the RIS with relatively high gain in one or more directions. High gain interference in one or more directions may be detrimental to wireless communication because it can adversely affect ongoing transmission and reception in those directions, creating bursty interference that hampers link adaptation.

Certain aspects of the present disclosure provide techniques for mitigating the adverse impact of high-gain interference caused by reflections from a RIS. In one example, a network entity may configure RIS elements with a configuration designed to prioritize (optimize) desired direction gain, while introducing interference randomization to mitigate gain in non-target directions. This interference randomization may be achieved without having to rely on precise analytical models and tightly coordinated resource allocation. By applying such a RIS configuration, a RIS controller may also mitigate the gain of any reflected non-target incident signals, reducing interference in those directions while maintaining desired direction gain for a target incident signal.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

Figure 1:
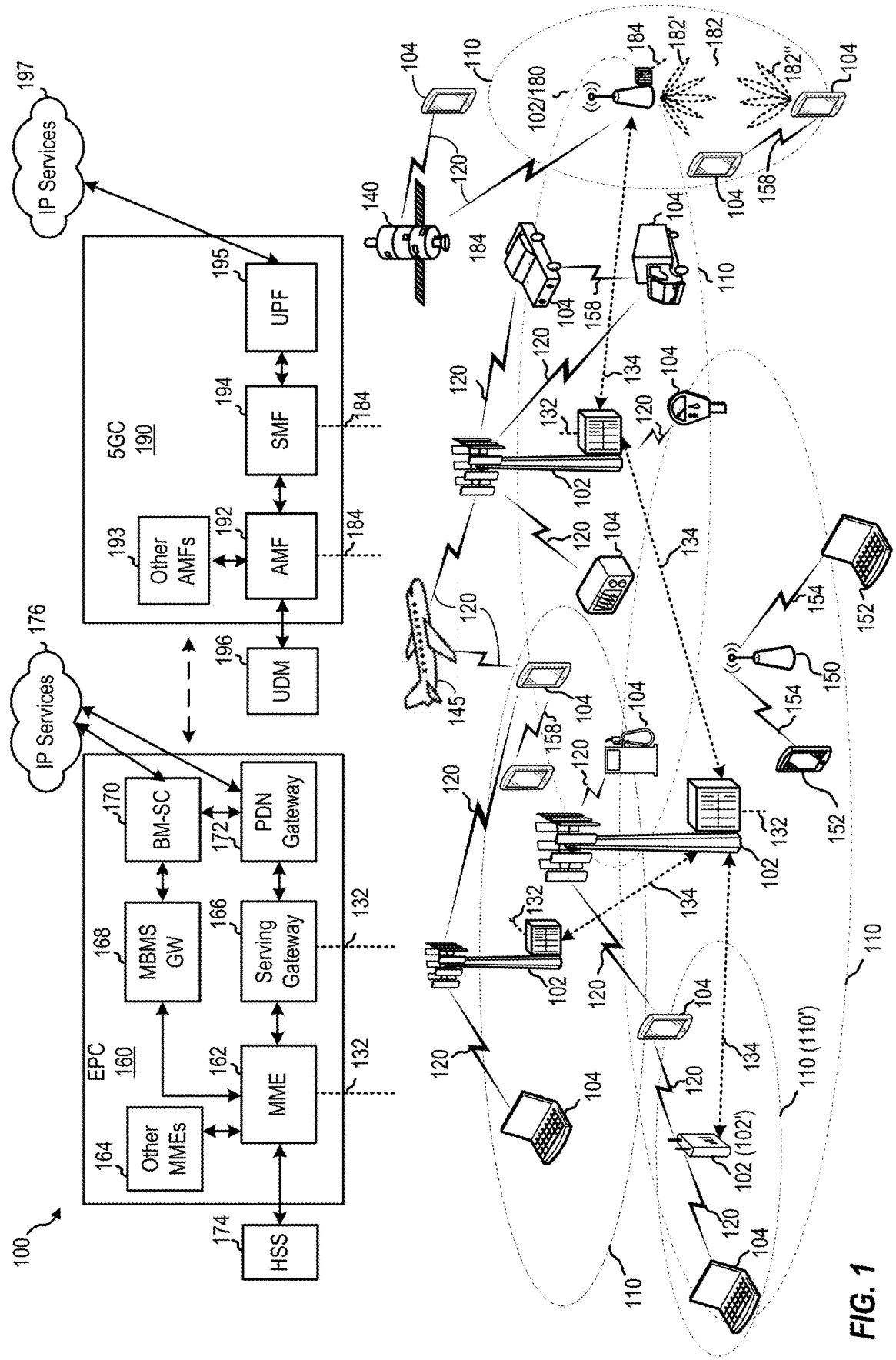
FIG. 1 depicts an example wireless communications network.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
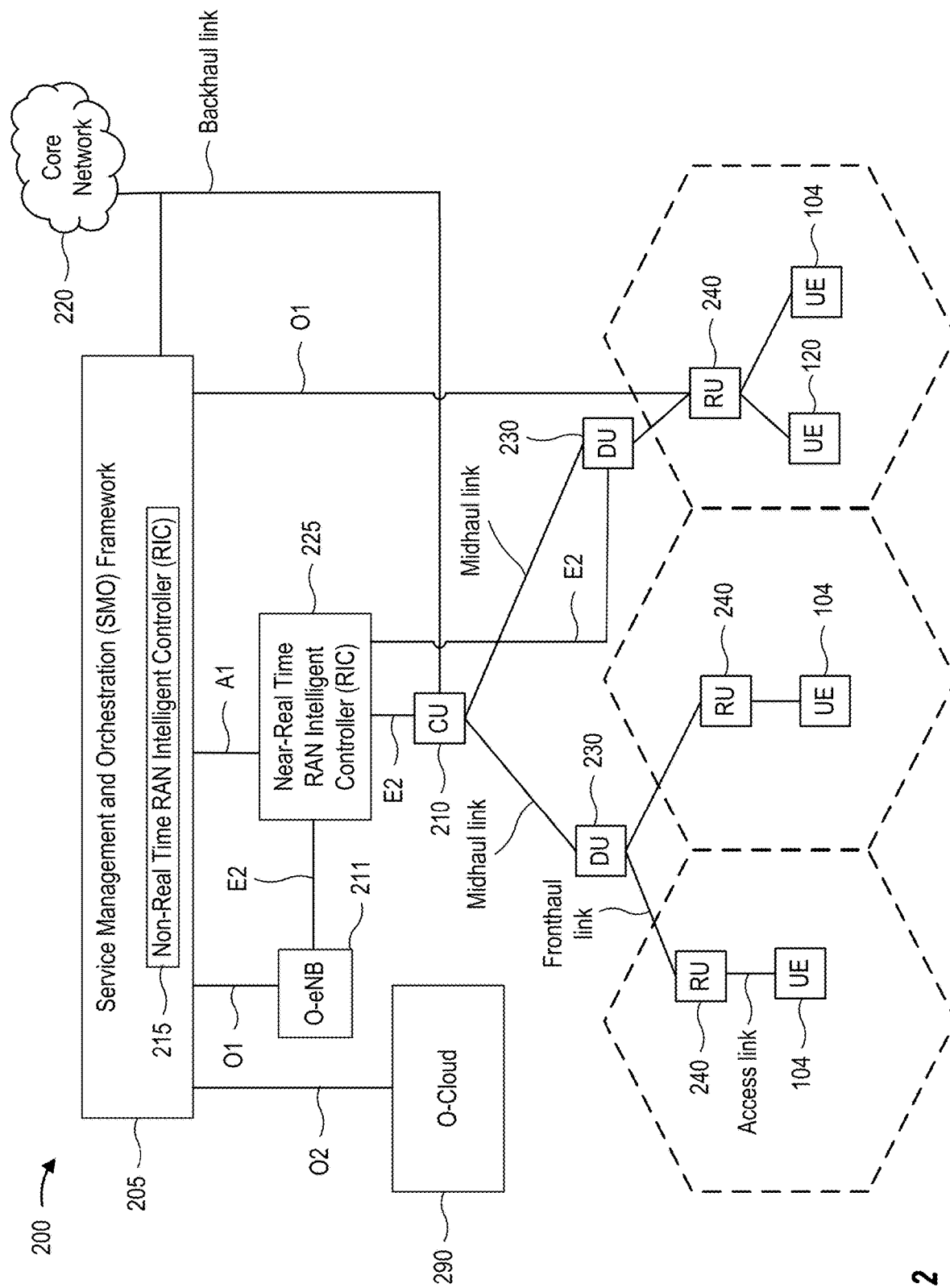
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an AI interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as AI policies).

Figure 3:
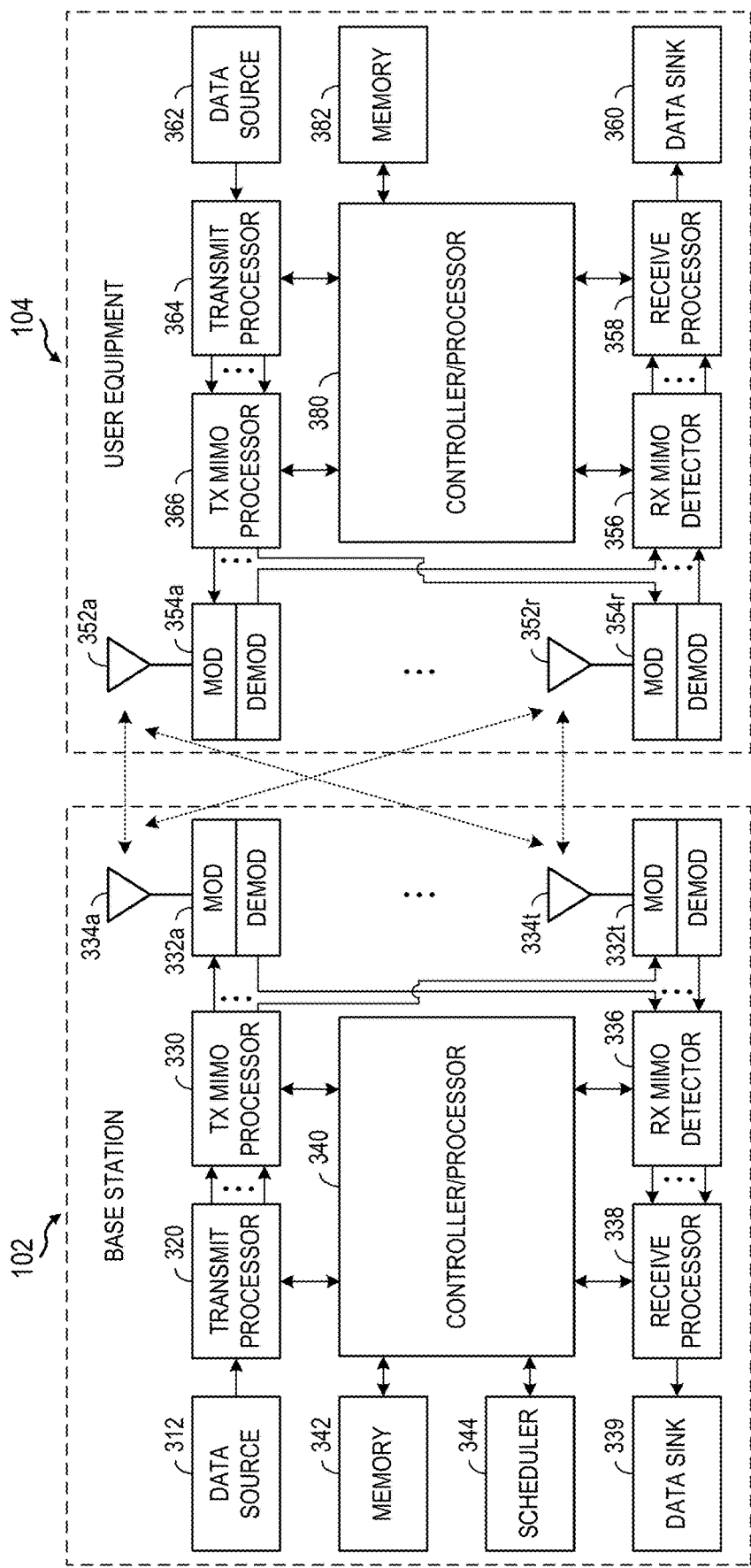
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a-332t*. Each modulator in transceivers 332*a-332t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a-332t* may be transmitted via the antennas 334*a-334t*, respectively.

In order to receive the downlink transmission, UE 104 includes antennas 352*a-352r* that may receive the downlink signals from the BS 102 and may provide received signals to the demodulators (DEMODs) in transceivers 354*a-354r*, respectively. Each demodulator in transceivers 354*a-354r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a-354r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a-354r* (e.g., for SC-FDM), and transmitted to BS 102.

At BS 102, the uplink signals from UE 104 may be received by antennas 334*a-t*, processed by the demodulators in transceivers 332*a-332t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figures 4A, 4B, 4C, 4D:
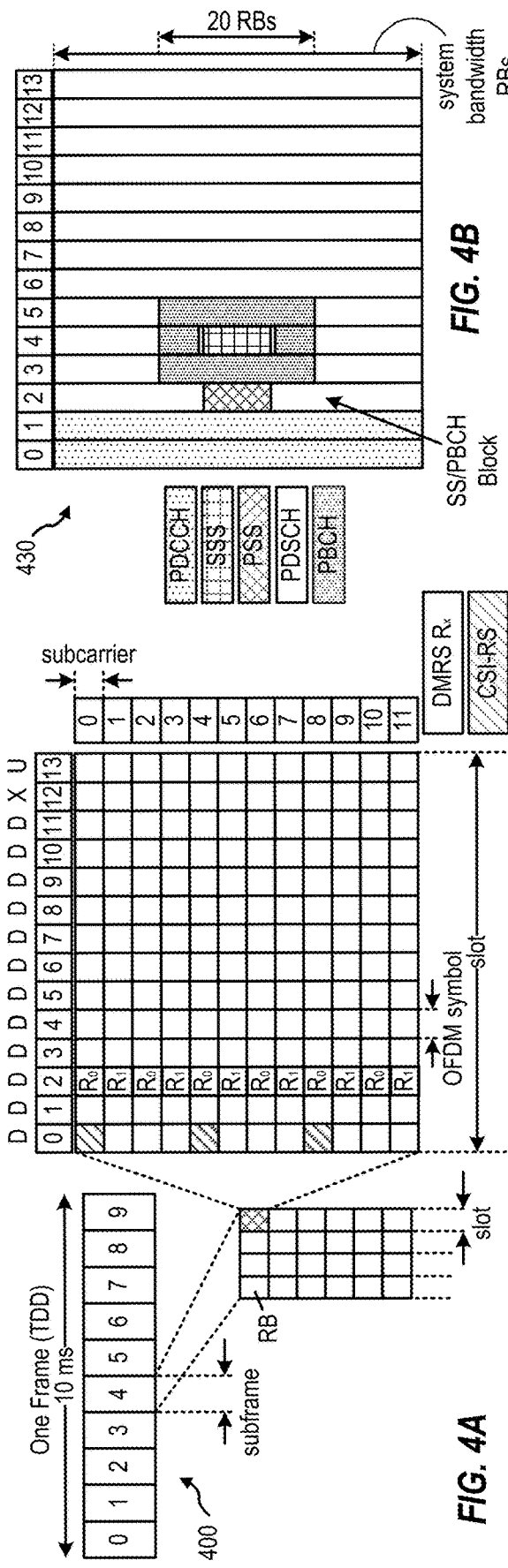
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2p slots/subframe. The subcarrier spacing and symbol length/duration are a function of the numerology. The subcarrier spacing may be equal to $2^1 \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 as.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Overview of Reconfigurable Intelligent Surface (RIS)

Massive multiple input multiple output (MIMO) configuration increases throughput. For example, MIMO may achieve a high beamforming gain by using active antenna units (AAUs) and may operate with individual radio frequency (RF) chains for each antenna port. Unfortunately, the use of the AAUs may significantly increase power consumption.

As discussed above, to further such advantages and extend coverage, reconfigurable (or reflective) intelligent surfaces (RISs) may be deployed to reflect impinging beams/signals in desired directions. RIS has been proposed as a low-cost array of passive and reconfigurable reflecting elements that can boost coverage and spectral efficiency. In some cases, the RISs may operate without the substantial power consumption when operating passively to only reflect or refract signals from a transmitter device towards a receiver device. In some cases, the reflection or refraction direction may be controlled by a network entity or a monitoring user equipment (UE). Configurability of a RIS allows a network to realize multiple anomalous reflections (each specified by a target incident direction and reflected direction pair) and assist its choice of UEs, by enhancing the end-to-end channel seen by them.

Figure 5:
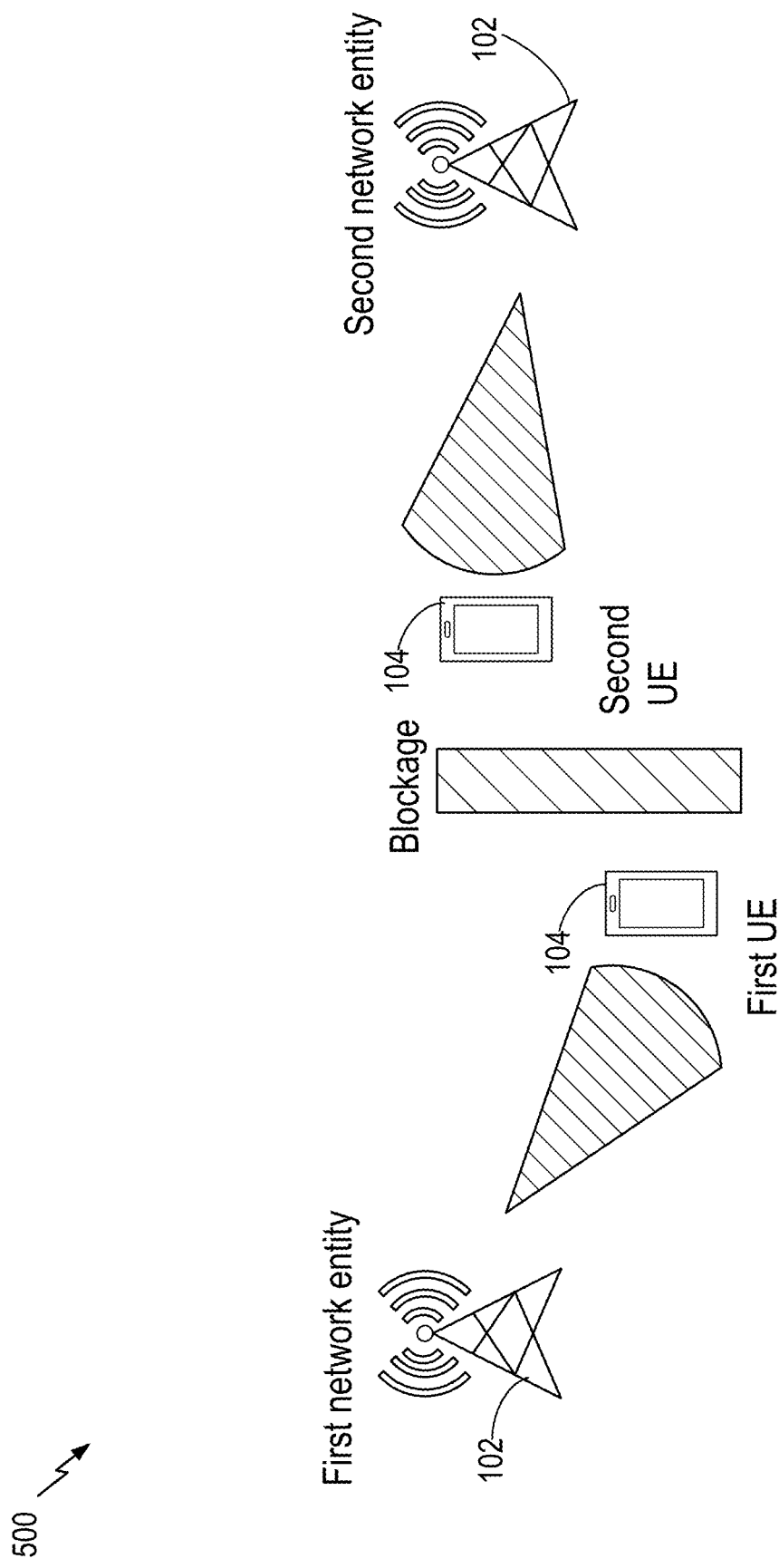
FIG. 5 depicts an example wireless communication network impeded by a blockage.

FIG. 5 illustrates an example deployment 500 with communication blockage between wireless communication devices. As shown, impeded by the blockage, a first network entity may only transmit to a first UE and may not reach a second UE, as the blockage prevents signals from reaching the second UE. Also, a second network entity may only transmit to the second UE and may not reach the first UE, as the blockage prevents the signals from reaching the first UE. The blockage also prevents the first UE from establishing sidelink communications with the second UE. As such, the second UE may not be able to communicate with the first network entity or the first UE, and the first UE may not be able to communicate with the second network entity or the second UE.

Figure 6:
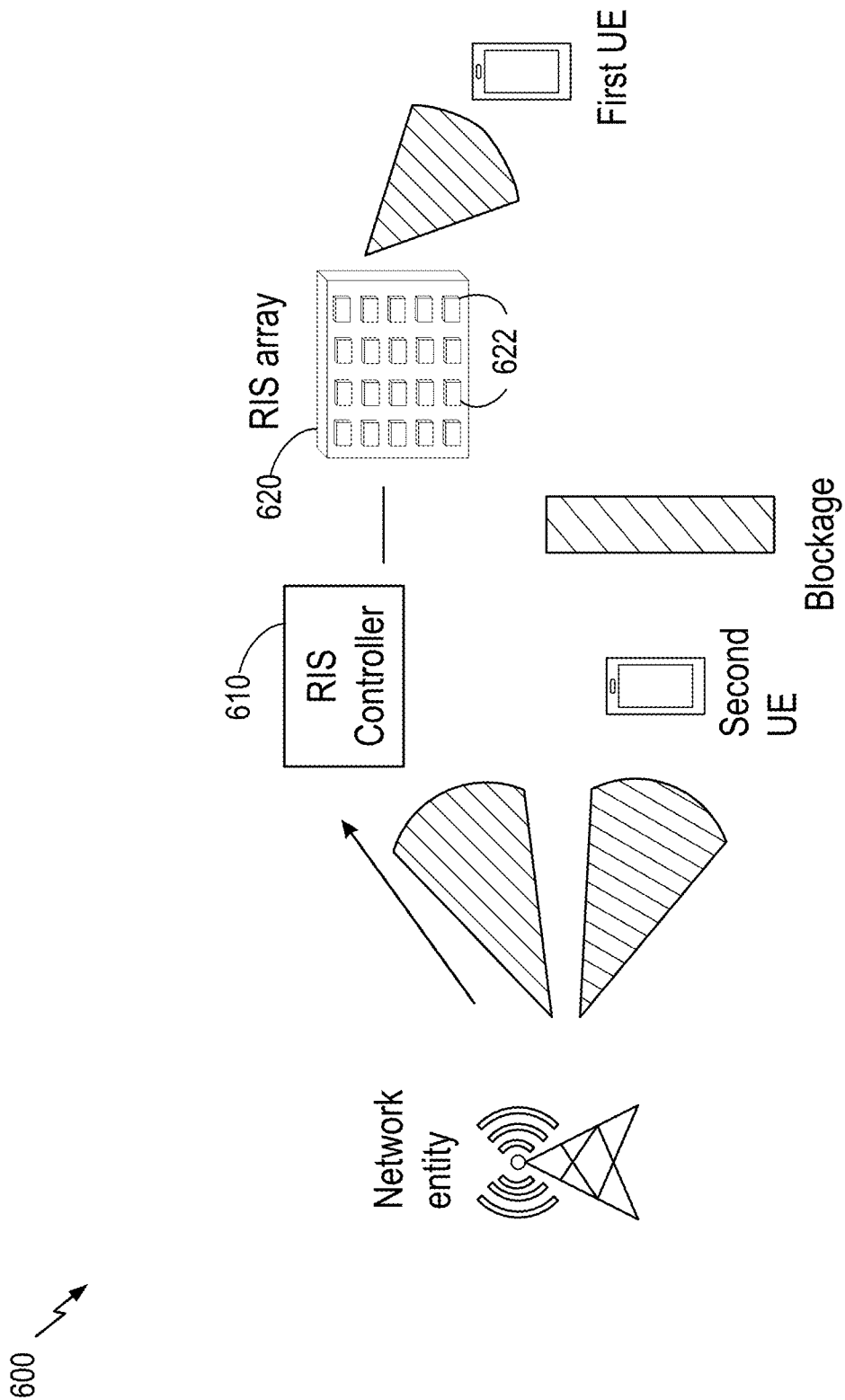
FIG. 6 depicts an example wireless communication network having an array of reconfigurable intelligent surface (RIS) elements.

FIG. 6 illustrates an example deployment 600 using an array 620 of RIS elements 622 to overcome a blockage. As shown, the RIS elements may be introduced to reflect or otherwise re-radiate radio signals to bypass the blockage. For example, communications between a network entity and a first UE may be enabled by the RIS re-radiating one or more signals from the network entity towards the first UE and vice versa. Furthermore, the RIS elements can also be reconfigured via a RIS controller 610 (i.e., directing incoming and outgoing beams at different angles) to enable a second UE and the first UE to establish sidelink communications.

In some cases, an RIS may be a full-duplex (FD) device. FD communication allows for simultaneous transmission between devices. Half-duplex (HD) communication flows in one direction at a time. In operation, the RIS may immediately reflect a received signal from a transmitter device to a receiver device.

In some cases, a RIS may have a RIS-MT (mobile terminated) component (controller) for communicating with a gNB on the control-link, and a RIS-FWD (forwarding) component for forwarding/reflecting signals between a gNB and UE(s).

In some cases, a RIS may perform passive beamforming. For example, the RIS may receive signal power from a transmitter device proportional to a number of elements such as RIS elements of the RIS. When the RIS reflects or refracts a radio signal, one or more RIS elements may cause phase shifts to perform the beamforming or precoding. The phase shifts may be based on precoding weights (e.g., a multiplier or an offset of a time delay) applied to the one or more RIS elements. In some cases, for an array of RIS elements of the RIS, an RIS controller of the RIS may generate or specify a precoding weight for each RIS element.

In some cases, a RIS may be configured according to a (direction of a) target incident signal and a (direction of a) target reflected signal. A target incident signal generally refers to a signal travelling towards the RIS in a desired incident direction. A target reflected signal generally refers to a signal reflected by the RIS in a desired reflected direction (e.g., towards a targeted recipient). For example, the target reflected signal may be a reflected version of the target incident signal. As used herein, target incident direction generally refers to a desired direction of a target incident signal, while target reflected direction generally refers to a desired direction of a target reflected signal. Desired directions may be based on a desired objective, such as gain optimization as described in greater detail below. In some cases, signals incident on and/or reflected by a RIS that are not propagated in a target directions may be considered non-target and/or non-desired signals.

Aspects Related to Interference Randomization in RIS Communications

As discussed above, a RIS (an array of RIS elements) may be configurable, via a RIS controller, to allow a network entity to enhance the visibility of an end-to-end channel for a target UE.

When an optimized RIS configuration reflects a target incident signal with enhanced gain along a desired reflect direction (or towards a particular desired focusing point), the RIS configuration may also reflect strong interference in additional undesired reflect directions. Additionally, non-target incident signals may also be reflected by the RIS with high gain in one or more directions. High gain interference in one or more directions is detrimental to wireless communication because it can adversely affect ongoing transmission and reception in those directions, creating bursty interference that hampers link adaptation.

Figure 7:
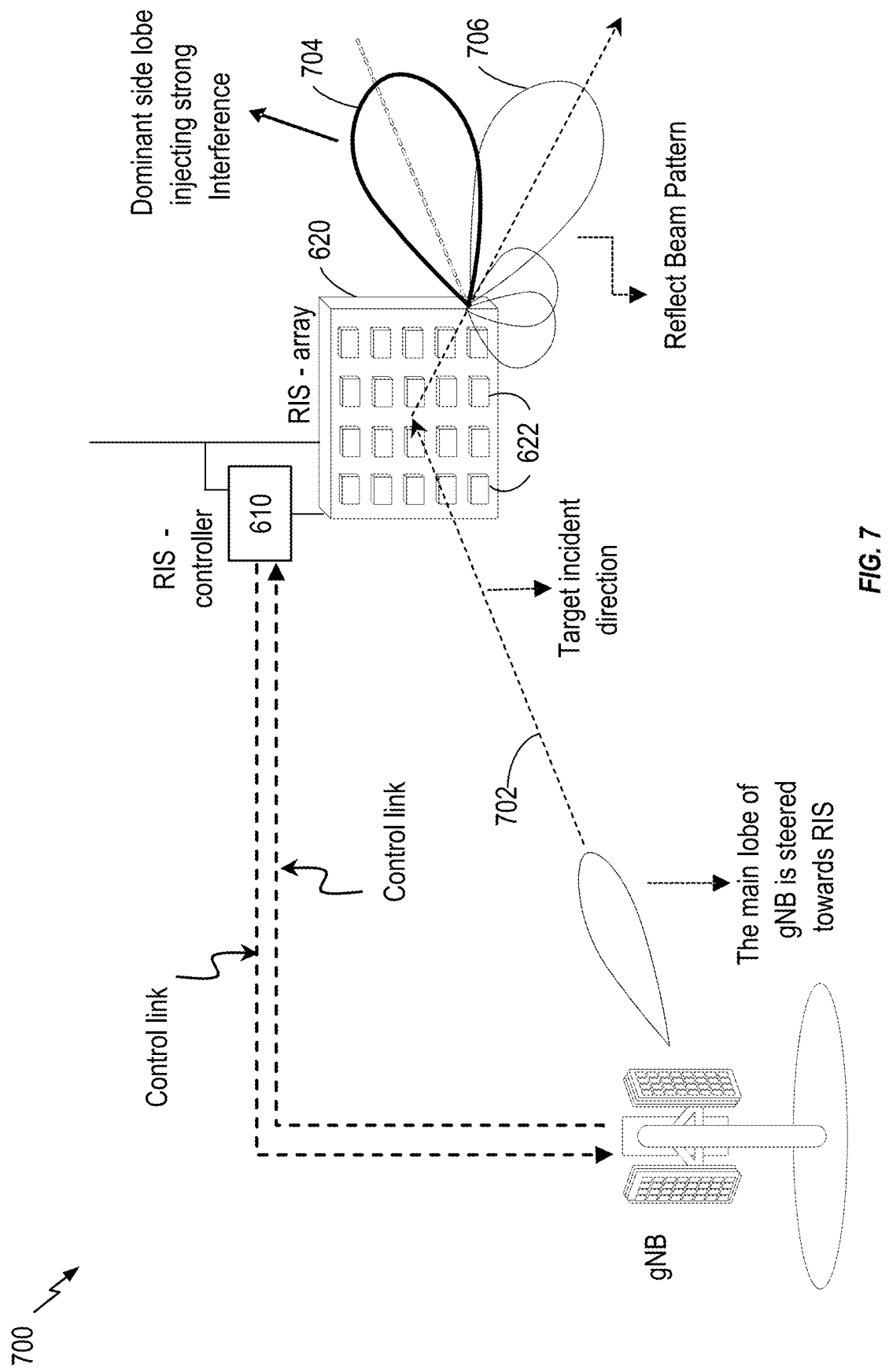
FIG. 7 depicts an example of interference resulting from RIS element reflections.

This high-gain interference issue is illustrated in the example deployment 700 of FIG. 7. A RIS controller 610 may configure the RIS array 620 such that, when a gNB transmits a signal 702 in a target incident direction, the reflected beam pattern may be optimized in an attempt to ensure a desired direction gain in the target reflection direction 706. However, as illustrated, the optimized configuration may also inject dominant/high-gain interference along one at least one other non-target reflection direction, as shown at 704.

Certain aspects of the present disclosure provide techniques for mitigating the adverse impact of such high-gain interference caused by reflections from a RIS. In one example, a network entity may configure a RIS with a configuration optimized to prioritize desired direction gain while introducing interference randomization (e.g., dithering) to mitigate gain in non-target directions. Interference mitigation may be introduced to randomize reflections from, for example, target incident signals. Randomization may allow energy from a target incident signal that is reflected to non-target reflected directions to be more evenly spread across those non-target reflected directions. More generally, randomization may allow energy from any incident signals (e.g., target and non-target incident signals) that are reflected in all directions to be more evenly spread in those directions. The extent to which spreading evenly distributes the reflected energy may be quantified according to certain randomization metrics, discussed in more detail below.

In some cases, the interference randomization may be achieved without having to rely on precise analytical models and tightly coordinated resource allocation. By applying such a RIS configuration, a RIS controller may help mitigate the gain of any reflected non-target incident signals, reducing interference in those directions while maintaining gain for a target incident signal.

Figure 8:
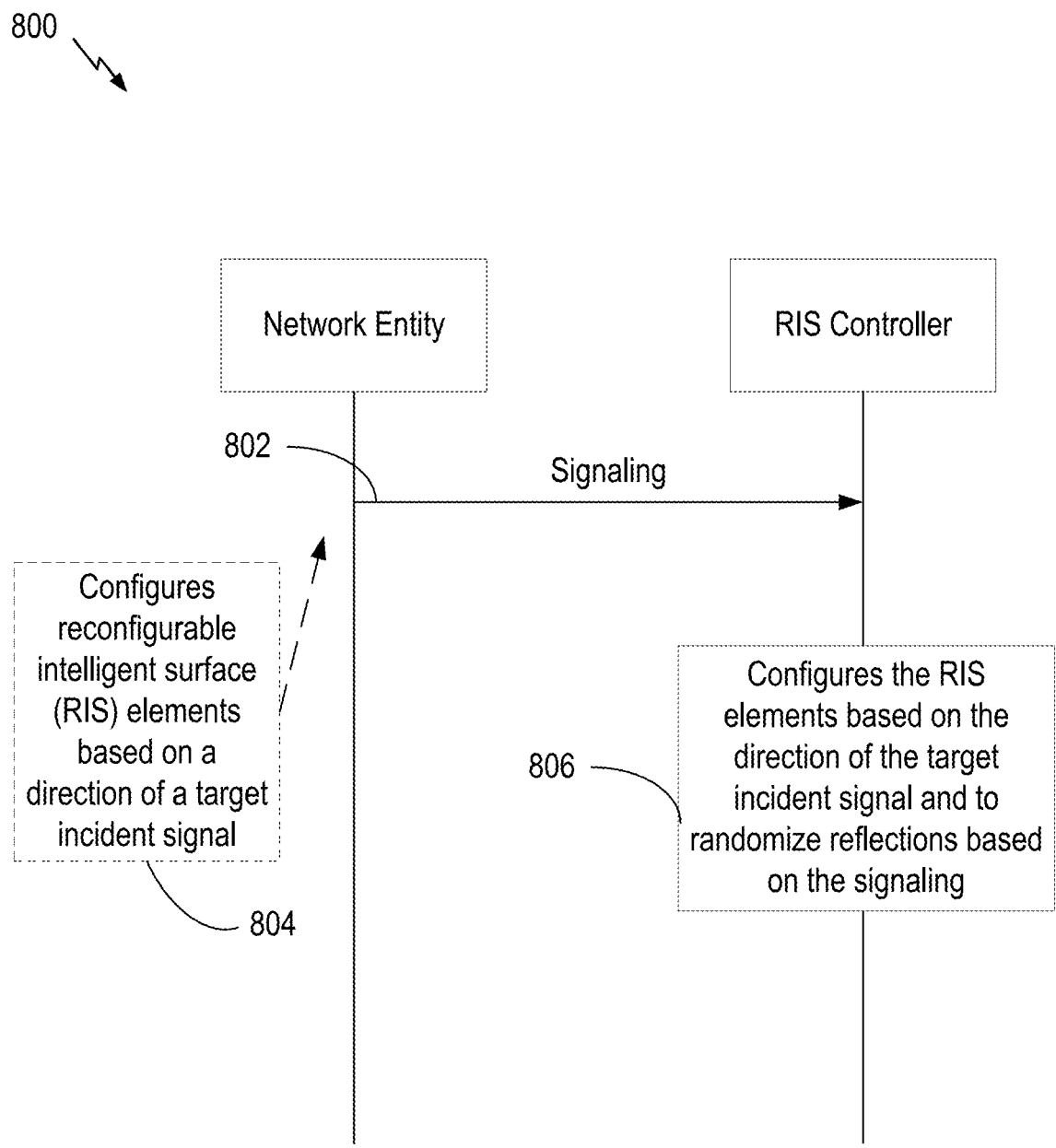
FIG. 8 depicts a call flow diagram for communications in a network between a network entity and a RIS controller, according to certain aspects of the present disclosure.

Mechanisms proposed herein for mitigating the adverse impact of high-gain interference caused by reflections from RIS elements may be understood with reference to the call flow diagram 800 of FIG. 8. In some aspects, the network entity of FIG. 8 (FIG. 15, and/or FIG. 16) may be an example of the BS 102 (e.g., a gNB) depicted and described with respect to FIGS. 1 and 3 or a disaggregated base station depicted and described with respect to FIG. 2. Additionally, a gNB may be another type of network entity or network node, such as those described herein.

As illustrated at 802, the network entity may send signaling to a RIS controller. As illustrated at 804, the signaling may cause the RIS controller to configure RIS elements based on a direction of a target incident signal and a direction of a target reflected signal. Based on the signaling, at 806, the RIS controller configures the RIS elements based on the direction of the target incident and the direction of the target reflected signal to randomize reflections in non-target reflect directions. In one example, the RIS elements may be configured at a RIS array, as described above with respect to FIG. 6 and FIG. 7.

Figure 9:
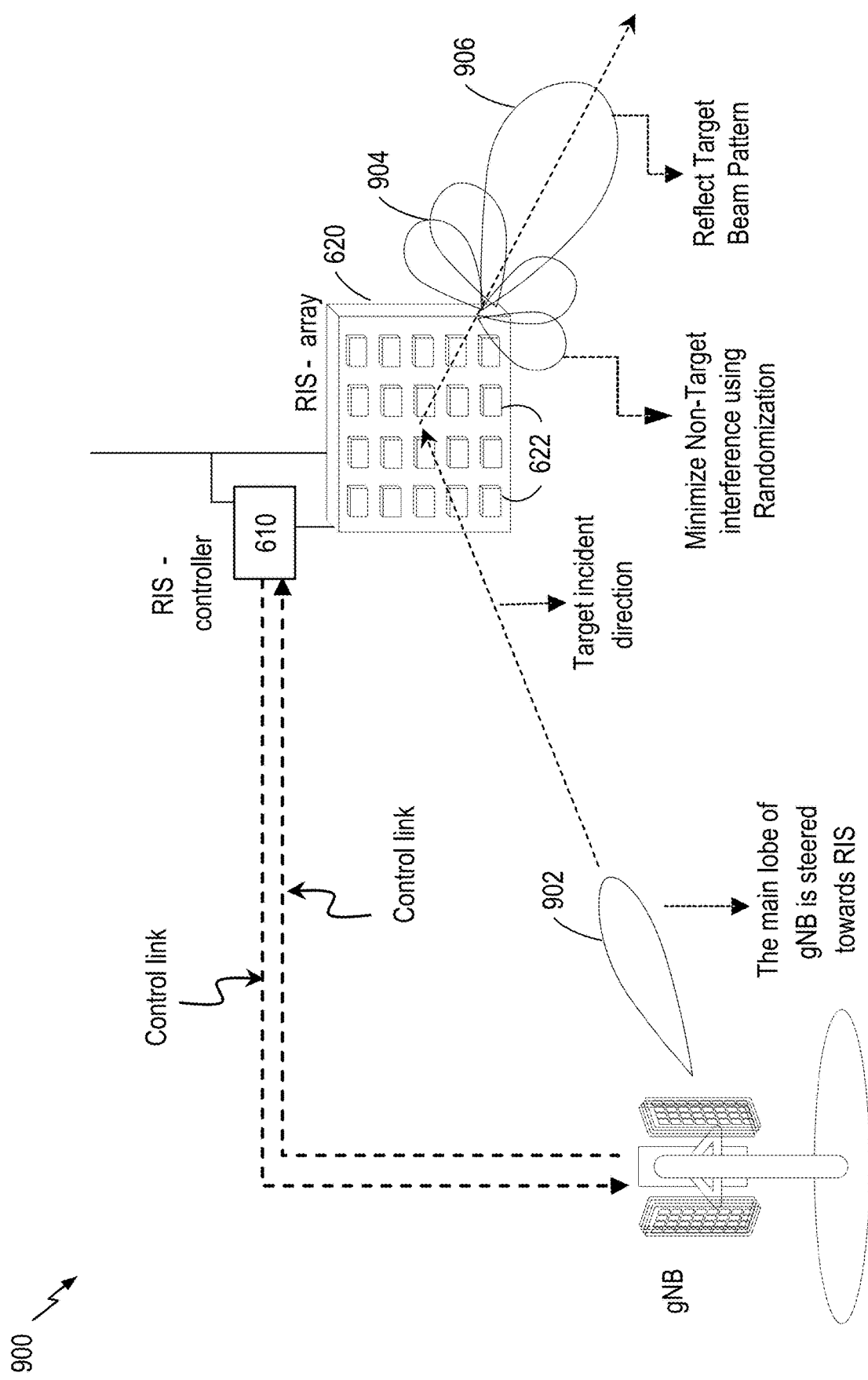
FIG. 9 depicts an example wireless communication network with a RIS controller configured to randomize interference, according to certain aspects of the present disclosure.

By configuring the RIS elements to randomize reflections of non-target incident signals, the RIS controller may be optimized for both high desired reflect direction gain (of signal 902 in a target incident direction) and randomization of interference from side lobes in non-target reflect directions. As illustrated in the example deployment 900 of FIG. 9, optimizing the RIS elements in this manner may contribute only a small loss in gain along desired reflect direction 906, while reducing peak interference in non-target reflect directions 904, which may allow reflect signal interference to maintain a more uniform spread across multiple directions. The reduced peak interference at 904 may be compared to the dominant interference at 704 of FIG. 7, further illustrating the mitigating effect of randomization applied by the RIS controller of FIG. 9.

According to certain aspects, an interference mitigation design based on intrinsic randomization (e.g., by dithering coefficients of RIS elements) may achieve suppression of spurious dominant side-lobes without any significant impact on desired reflect direction peak gain. Intrinsic randomization may be applied at a RIS to mitigate interference from reflections of incident signals from one or multiple gNBs. For example, a RIS controller may vary (dither) coefficients used to configure RIS elements in a RIS array.

Figure 10:
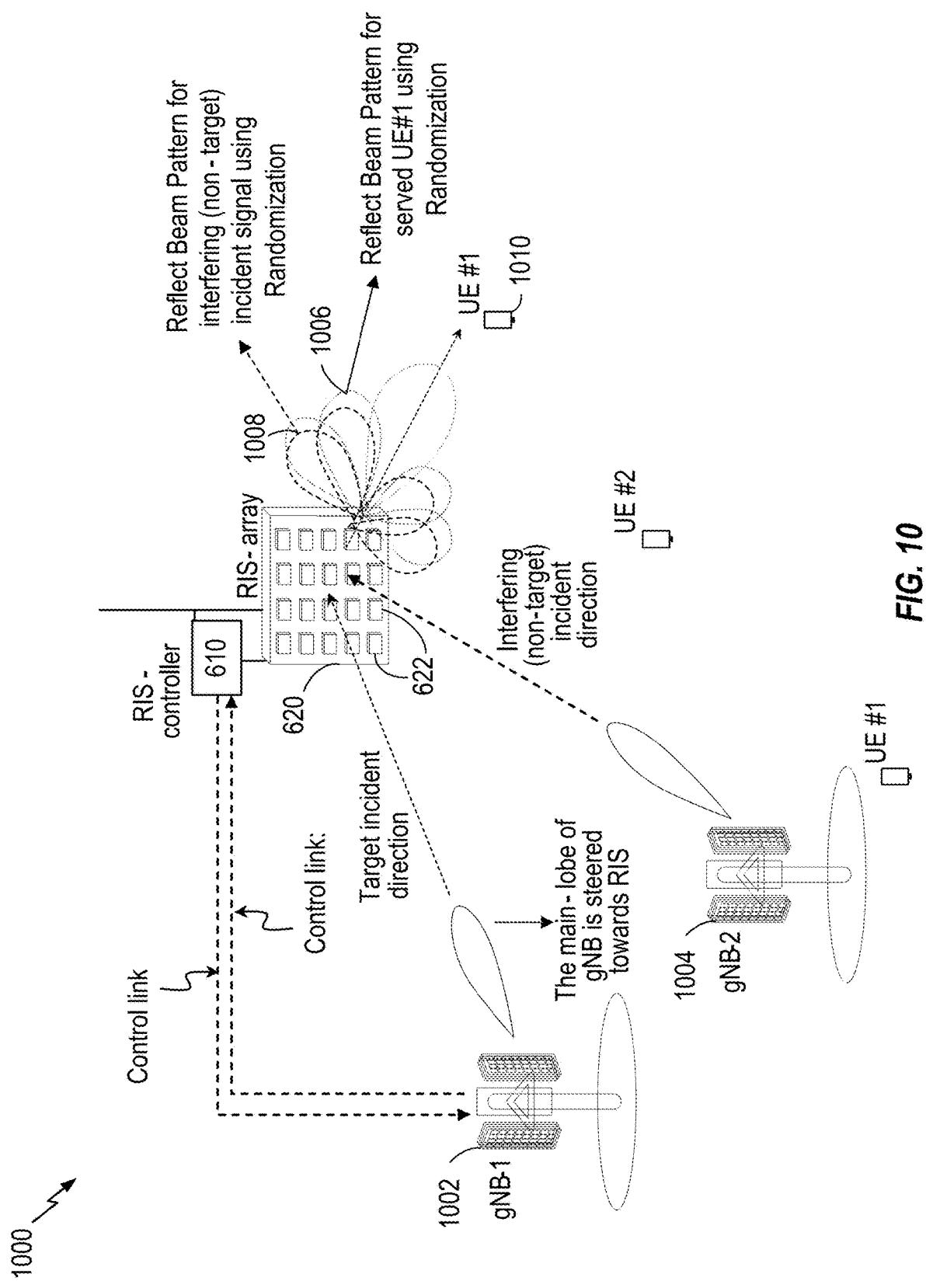
FIG. 10 depicts an example wireless communication network with a RIS controller configured to randomize interference, according to certain aspects of the present disclosure.

In some cases, as illustrated by the example deployment 1000 of FIG. 10, when a RIS is assisting a target gNB (e.g., gNB1 1002), a non-target gNB (e.g., gNB2 1004) belonging to another operator (e.g., operating on an adjacent band) may create a reflect beam pattern of interfering incident signals at the RIS.

To account for the non-target incident signals from gNB2, the RIS may be configured to intelligently boost reflection of target incident signals from gNB1 along a desired direction. At the same time, the RIS controller may configure the RIS elements to apply randomization to incident signals from both gNB1 and gNB2 in order to uniformly disperse their reflections over many non-target directions. By applying randomization to incoming incident signals, signals from gNB1 are reflected according to a reflect beam pattern 1006, allowing the RIS to reliably serve a first UE 1010 (e.g., UE #1) without injecting significant interference from spurious dominant side-lobes. Additionally, signals from gNB2 are reflected according to a reflect beam pattern 1008, thereby reducing bursty (or high peak) interference to adjacent-band traffic.

In some cases, a RIS configuration may configure a RIS controller to apply intrinsic randomization according to a codebook. In this context, a codebook may include entries of coefficients used to configure RIS elements of a RIS array. Thus, an array of RIS elements may be configured using a codebook entry from a codebook.

Figure 11A:
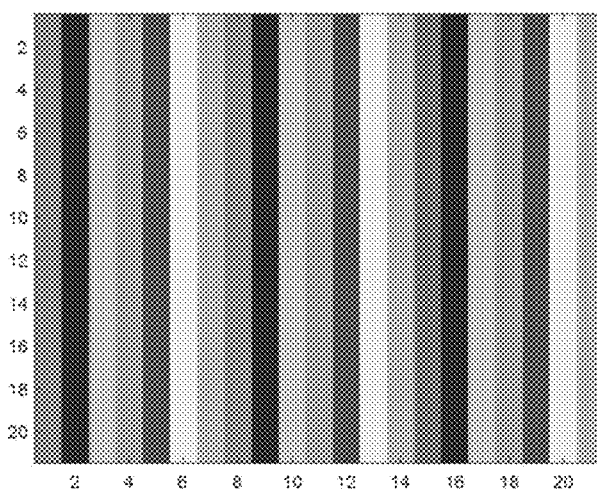
FIGS. 11A-11C depict example RIS configurations, including RIS configurations designed to randomize interference, according to certain aspects of the present disclosure.
Figure 11B:
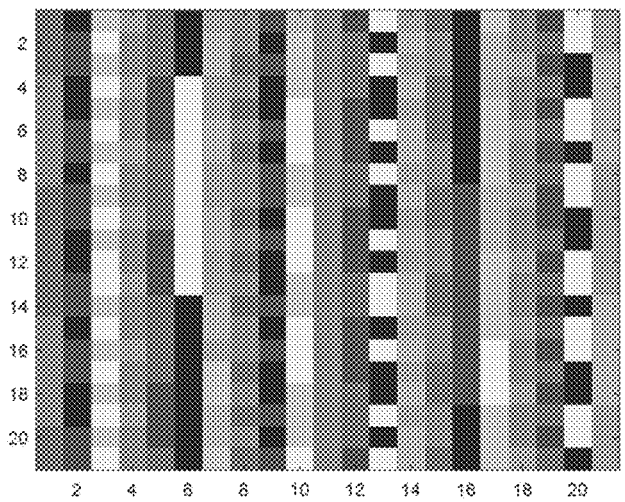
Figure 11C:
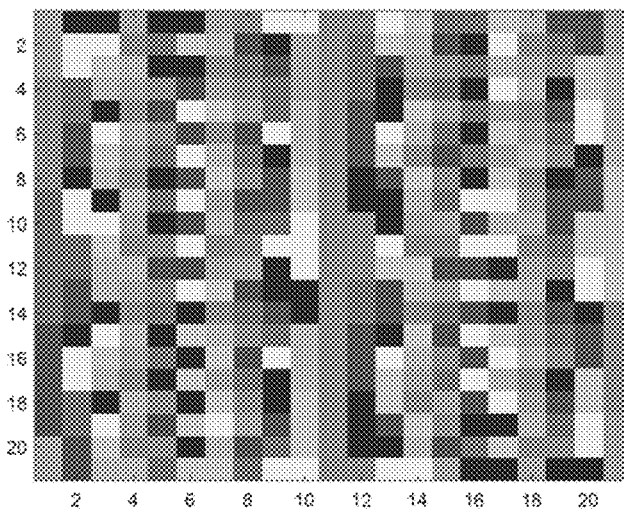

In some cases, a codebook may be selected from one of a set of codebooks, to achieve a desired effect. For example, each codebook may be configured, based on a specific X-bit per-element control and a degree of intrinsic randomization. Examples of various 21×21 RIS configurations having a codebook applied at a RIS controller are illustrated in FIGS. 11A-11C. Each RIS configuration may reflect a target incident angle, $\theta_{id}=0°$ to target reflect angle, $\theta_{rd}=60°$. Each of the 21×21 elements in a configuration generally corresponds to a configuration (coefficient) of a corresponding RIS element.

FIG. 11A illustrates an example RIS configuration 1100A with no randomization and 3-bit per-element control. In the illustrated example, coefficients in the vertical direction are unchanged. Application of this RIS configuration may create only a small loss in gain (e.g., 0.2 dB) along a desired reflect direction for reflection of a target incident signal compared to an ideal phase alphabet. However, application of this RIS configuration may result in a higher likelihood of reflecting non-target interfering incident signals with higher gain in one or more dominant directions. This RIS configuration may appear regular to non-target incident signals. In one example (e.g., Non-Target Incident, $\theta_i=45.83°$), application of the RIS configuration of FIG. 11A may result in one dominant reflected signal interference direction and less spreading of reflected signal energy.

FIG. 11B illustrates an example RIS configuration 1100B with 8 phase shift key (8-PSK) (e.g., 3-bit) intrinsic randomization and 2-bit per-element control. As illustrated, relative to the example shown in FIG. 11A, coefficients are varied in the vertical direction. Assuming 1-bit of randomization, the value in FIG. 11B could be either the same as that shown in FIG. 11A (e.g., if the bit is 0) or varied by an amount (e.g., if the bit is 1). Application of this RIS configuration may create some loss in gain (e.g., <1 dB) along a desired direction for reflection of a target incident signal compared to an ideal phase alphabet, but may also result in a smaller likelihood of reflecting interfering incident signals with higher gain in one or more dominant directions. This RIS configuration may appear somewhat irregular to non-target incident signals. In one example, application of the RIS configuration of FIG. 11B may result in increased spreading of reflected signal energy.

FIG. 11C illustrates an example RIS configuration 1100C with 8-PSK (e.g., 3-bit) intrinsic randomization alphabet and 1-bit per-element control. As illustrated, relative to the example shown in FIG. 11B, coefficients are even more varied (appearing less regular) in the vertical direction. Assuming 2-bits of randomization, the value in FIG. 11C could be either the same as that shown in FIG. 11A (e.g., if the 2-bit value is 0) or varied by an amount (e.g., if the 2-bit value is non-zero). Application of this RIS configuration may create a larger loss in gain (e.g., 3 dB) along a desired direction for reflection of a target incident signal compared to an ideal phase alphabet, but may also result in a reduced likelihood of reflecting interfering incident signals with higher gain in one or more dominant directions. This RIS configuration may appear irregular to non-target incident signals. In one example, application of the RIS configuration of FIG. 11C may result in notably increased spreading of reflected signal energy.

Figure 12A:
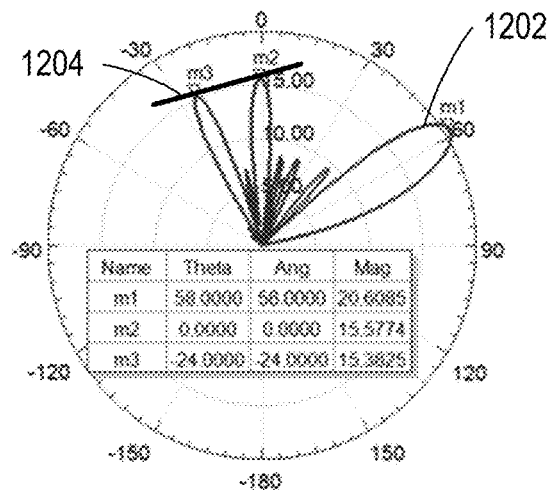
FIGS. 12A-12C depict example gain graphs associated with RIS configurations for a 0° incident direction, according to certain aspects of the present disclosure.
Figure 12B:
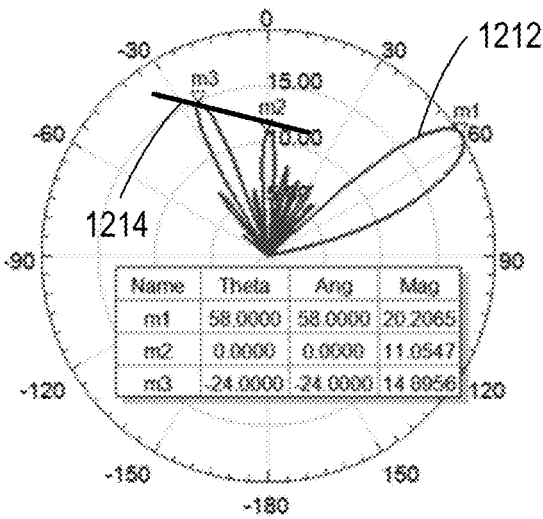
Figure 12C:
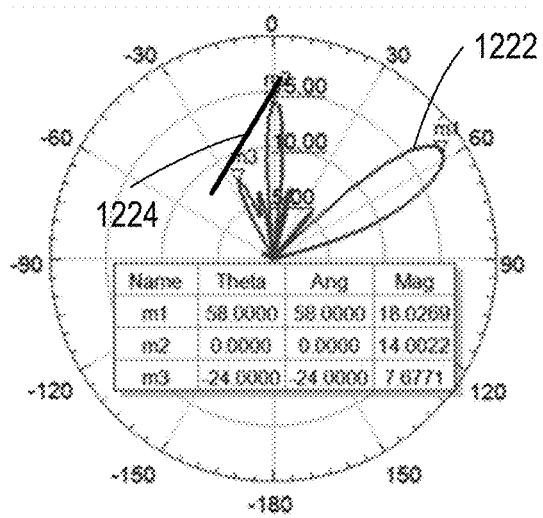

To further illustrate the impact of intrinsic randomization, example gain charts FIGS. 12A-12C are presented to demonstrate side lobe gain decrease associated with intrinsic randomization. In the examples shown in FIGS. 12A-12C, the RIS size is equal to $7\lambda_0 \times 7\lambda_0$, the unit cell is equal to ⅓ $\lambda_0$, the direction of target incident signal is 0°, and the desired reflection direction is 59°.

FIG. 12A, which may correspond to the example configuration shown in FIG. 11A, illustrates a gain chart for a RIS configuration having no randomization and 3-bit per-element control. As shown at 1202, the gain in the desired reflection direction is relatively high (>20 dB). However, because interference randomization is absent, target incident signals are also reflected with relatively high gain (>15 dB) along few non-desired reflect directions, as shown at 1204.

FIG. 12B, which may correspond to the example configuration shown in FIG. 11B, illustrates a gain chart for a RIS configuration having 3-bit randomization and 2-bit per-element control. As shown at 1212, the gain in the desired reflection direction for target incident signal remains high (e.g., ~20 dB). Additionally, because interference randomization is introduced, target incident signals are reflected with reduced gain (e.g., 10 dB-15 dB) along few non target reflect directions, as shown at 1214. In this example gain chart, there is only a 0.4 dB loss in desired reflection gain as a result of randomization, as compared to the no-randomization example gain chart of FIG. 12A. Moreover, the increased randomization mitigates interference, for example, by reducing reflected interference peaks by up to 2 dB, and suppressing other prominent reflected signal side lobes.

FIG. 12C, which may correspond to the example configuration shown in FIG. 11C, illustrates a gain chart for a RIS configuration having 3-bit randomization and 1-bit per-element control. As shown at 1222, the gain in the desired reflection direction for target incident signal is somewhat reduced (e.g., to −18 dB). However, because significant interference randomization is introduced, target incident signals are reflected with notably reduced gain (e.g., 5 dB-11 dB) along few non-target reflect directions, as shown at 1224. In this example gain chart, there is a 2.6 dB loss in desired reflection gain as a result of randomization, as compared to the no-randomization example gain chart of FIG. 12A. Moreover, the increased randomization significantly mitigates interference, for example, by reducing reflected interference peaks by up to 8 dB, and suppressing other prominent reflected signal side lobes.

The impact of randomization may be observed at various directions of incident angles. As noted above, FIGS. 12A-12C are presented with respect to a target direction of incident angle equal to zero.

Figure 13A:
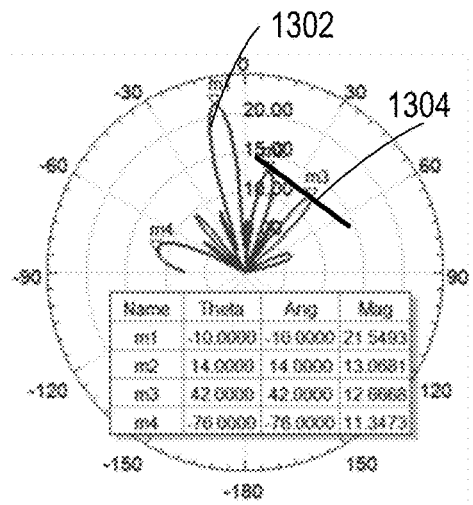
FIGS. 13A-13C depict example gain graphs associated with RIS configurations for a −15° incident direction, according to certain aspects of the present disclosure.
Figure 13B:
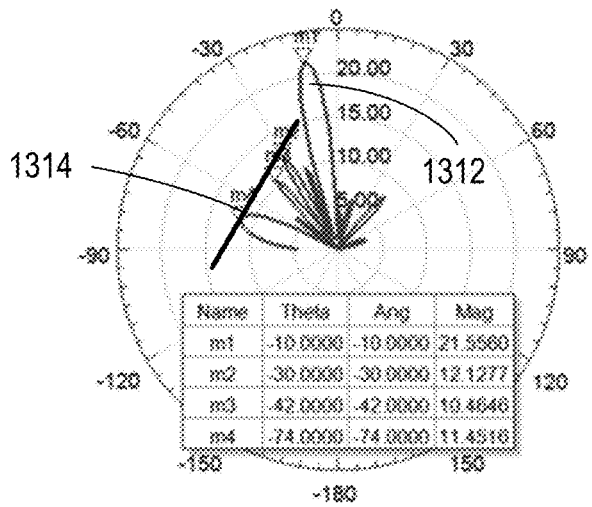
Figure 13C:
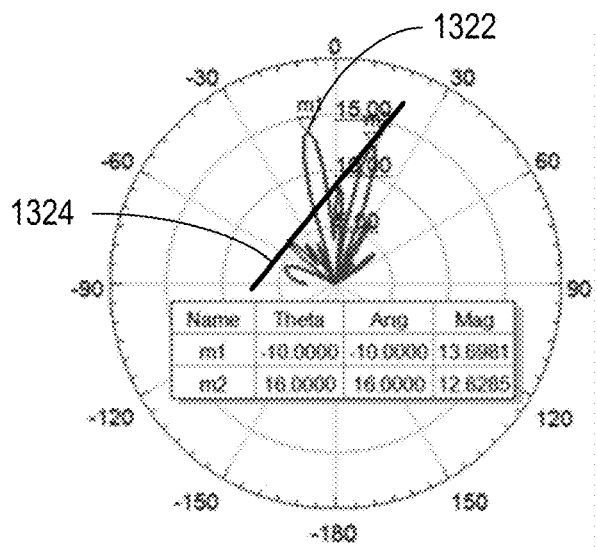

The example gain charts FIGS. 13A-13C, presented with the same RIS size, unit cell, target incident direction and desired reflection direction as FIGS. 12A-12C, show the interference mitigation observed at a non-target direction of incident angle equal to −15. As randomization increases, interference, is mitigated by reducing reflected interference peaks as shown in 1304, 1314, and 1324.

Figure 14A:
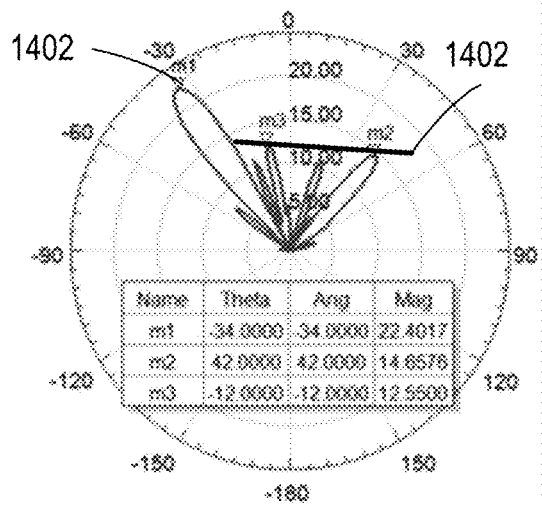
FIGS. 14A-14C depict gain graphs associated with RIS configurations for a −45° incident direction, according to certain aspects of the present disclosure.
Figure 14B:
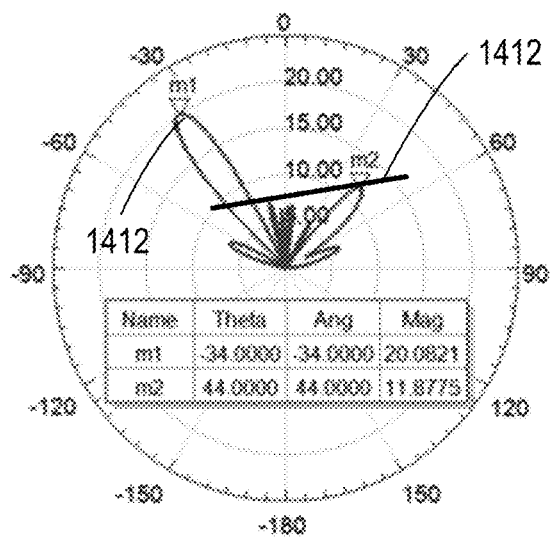
Figure 14C:
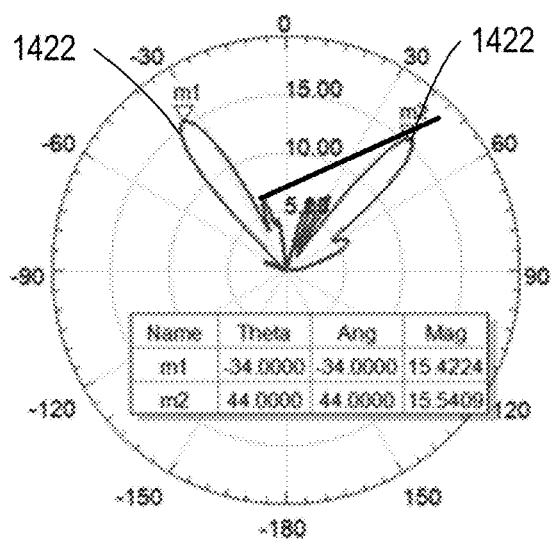

The example gain charts FIGS. 14A-14C, presented with the same RIS size, unit cell, target incident direction and desired reflection direction as FIGS. 12A-12C, show the interference mitigation observed at a non-target direction incident angle equal to −45. As discussed above with respect to FIGS. 13A-13C, as randomization increases, interference, is mitigated by reducing reflected interference peaks as shown in 1404, 1414, and 1424.

Aspects of the present disclosure provide certain mechanisms to select a degree of randomization configured at a RIS. In one case, multi-level codebooks to may be implemented at a RIS controller to achieve a desired target reflect direction gain and desired interference randomization. In other words, a RIS may be configured to support a capability to realize multi-level codebooks, each codebook having codewords with certain (desired or "good") gains towards multiple directions and offering varying levels of interference randomization capability. The RIS controller (or another network entity) may determine multiple codebooks that may be implemented as part of a RIS configuration. For each codebook, metrics for characterizing its desired reflect direction gain and interference randomization capability may be computed (aspects of codebook construction are described in detail below).

There are various options for determining multiple codebooks to use as part of a RIS configuration. In one option, a network entity (e.g., a gNB) may receive signaling from the RIS controller or other network entity. This signaling may include capability signaling indicating multiple codebook types and associated desired reflect direction gain and interference randomization capability metrics. This signaling may also include signaling indicating a type of codebook to use. The gNB may be provided with information about RIS capability/multi-level codebook information, via an indication. The indication may be an operations, administration and maintenance (OAM) and/or RIS-MT indication. In some cases, the indication can be in the form of control parameters, which may include at least a basic codebook and other information, such as a desired reflect direction gain and interference randomization capability. In some cases, multiple other codebooks may be indicated, each with their desired direction gain and interference capability metrics, along with the associated (quasi-)correspondence with the basic codebook. The indication may further characterize gains in the main/side-lobes associated with codewords in one or more codebooks.

In one option, a RIS controller may receive signaling from the gNB, for example, indicating a specific codebook to use and specific codeword in that codebook to use. This indication may be in the form of an index to a specific codebook, and a beam pattern index (e.g., a particular codeword). The beam index may refer to a transmission configuration indicator (TCI) state (e.g., a synchronization signal block (SSB) index), or a RIS configuration element in the RIS configuration codebook.

According to either option, a RIS may use N single-lobe configurations from a first codebook (codebook-1), for example, having certain average desired reflect direction gain and interference randomization capability (e.g., to forward N SSBs {SSB-1, SSB-2, . . . , SSB-N}. Similarly, a RIS may also use N single-lobe configurations from a second codebook (codebook-2), for example, having a different average desired reflect direction gain and interference randomization capability to forward N SSBs {SSB-1, SSB-2, . . . , SSB-N}.

In some cases, when a gNB seeks to take control of a RIS, for the purpose of interference randomization, the gNB may provide inputs to the RIS controller (or another NW entity) to configure the RIS elements. The inputs may include one or more of the following: an incident signal direction from the gNB1 to the RIS affiliated with the RIS controller, a distance between the gNB1 and the RIS, a range or span of expected reflected angles/directions, one or more codebook sizes (e.g., where codebook size equals number of codewords (RIS patterns) in that codebook), and a set of expected interfering signal directions that would be incident on the RIS. The set of expected interfering signal directions may include signals from other interfering sources that can be incident on the RIS, which the RIS may reflect in a diffuse manner.

According to certain aspects, multi-level codebooks may be constructed with intrinsic randomization/dither. For a RIS having N elements, dither may be generated as provided in the following equation:

$D=[d_1, \ldots, d_N]$, in 3-bit randomization alphabet, where each entry of D is an amount added to a RIS coefficient to achieve a desired irregularity.

A length-N Zadoff-Chu (ZC) sequence may be generated with a specified root, and (after a transformation) may be elementwise quantized to an 8-PSK randomization alphabet to obtain D. Each $d_m \in \{\exp\left(\frac{j2\pi k}{8}\right),$ $k=0, \ldots 7\} \forall m$ may be presented in an 8-PSK randomization alphabet, such that the dither pattern can be applied via 3-bit per RIS-element control. The dither pattern may also be gradually varied, for example, by choosing different ZC root. Given a set of anomalous reflections (each anomalous reflection is specified by target incident $(\theta_{id}, \phi_{id})$, and target reflect $(\theta_{rd}, \phi_{rd})$ directions), a codeword may be determined as follows:

First, a cascade channel $z=a(\theta_{id}, \phi_{id}) \odot a(\theta_{rd}, \phi_{rd})$ is determined, where each $a(\theta, \phi)$ is a steering vector (or array response vector) determined by direction (e.g., having angular coordinates $(\theta, \phi)$). Second, the RIS may be operated according to a b-bit per-element control in combination with on top of dither. Third, an optimized pattern is determined according to the following equation:

$\Gamma = Q(z \odot D), \Gamma[\Gamma_1, \ldots, \Gamma_N],$ where $\Gamma$ is an optimized pattern.

Here, Q(.) may be a 2-bit (b=2) control so that $\Gamma_m \in \{\pm 1, \pm j\} \forall m$, or Q(.) is 1-bit (b=1) control so that $\Gamma m \in \{\pm 1\} \forall m$, or Q(.) is 3-bit (b=3) control so that $\Gamma_m \in \{\exp\left(\frac{j2\pi k}{8}\right),$ $k=0, \ldots 7 \; \forall m$. This final option may be equivalent to not using dither. The optimized pattern, $\Gamma$, may thus be chosen considering dither and anomalous reflection target. The codeword is an elementwise product of $\Gamma$ and D, i.e., $\Gamma \odot D$, and has all elements in an 8-PSK (3-bit) randomization alphabet.

In some cases, using a larger control randomization alphabet size (larger b) may produce higher average gain along a desired direction, but also lower average interference randomization capability, and vice-versa. Using different ZC sequence root choices may yield different codebooks with similar average gain and average interference randomization capability. Moreover, hopping over such codebooks can further improve interference randomization without further sacrificing gain.

According to certain aspects, certain metrics may be determined for a codebook, as noted above. For example, such metrics may be presented for characterizing desired reflect direction gain and interference randomization capability of a codebook. As noted above, each codeword of a codebook may correspond to a RIS configuration or pattern (e.g., as illustrated in FIGS. 11A-11C). Average (desired reflect direction) gain of a codebook may be computed by averaging peak gain (directivity) along target reflection direction achieved by a codeword, over all codewords. Interference randomization capability of each codebook can be computed by finding a first metric considering a target incident direction. The first metric may be determined as the average of maximal side lobe peak levels over all RIS patterns (codewords) in the codebook. Alternatively, the first metric may be obtained by computing mean (or median) side lobe peak level (among side lobe peaks above a threshold) for each RIS pattern in the codebook and then computing the average of mean (or median) levels over all patterns. A second metric may be computed considering all non-target incident directions from a given set of typical (or anticipated) non-target incident angles/directions. For each direction in the set, a value that is the average level of maximal main lobe peak gain (or median gain among all lobes) may be determined considering all RIS patterns in the codebook. Then, the second metric may be obtained as an average of above determined values over all non-target incident directions from given set of such directions. Extension to second metric may also be added by further providing statistical variance information. In some cases, first and second metrics may be provided on a per-codeword basis, in which case the respective averaging over RIS patterns (codewords) in the codebook is not performed.

Aspects of the present disclosure provide certain mechanisms to update a codebook choice, for example, in an effort to balance interference randomization and desired gain tradeoff.

Figure 15:
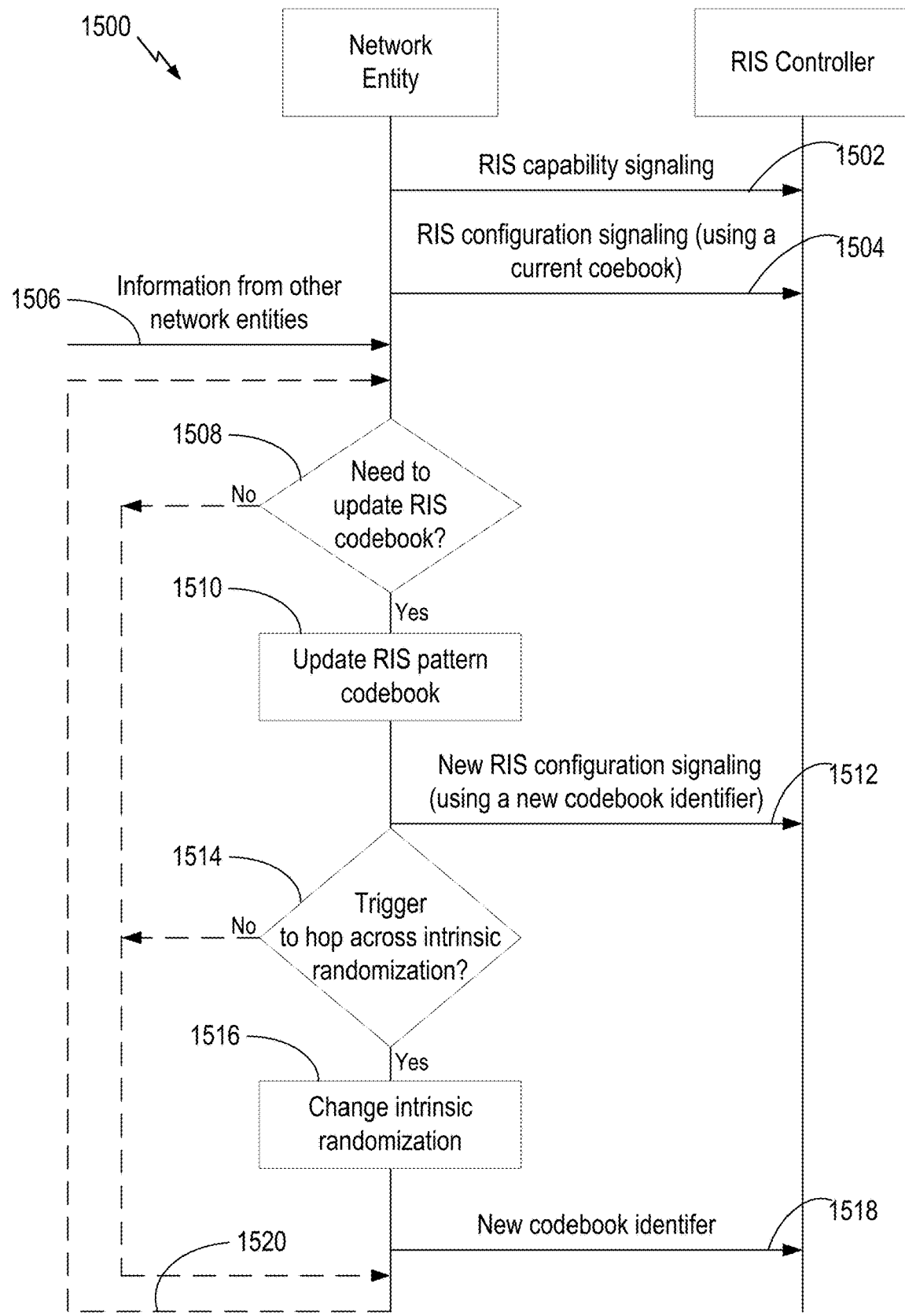
FIG. 15 depicts a call flow diagram for communications in a network between a network entity and a RIS controller, according to certain aspects of the present disclosure.
Figure 16:
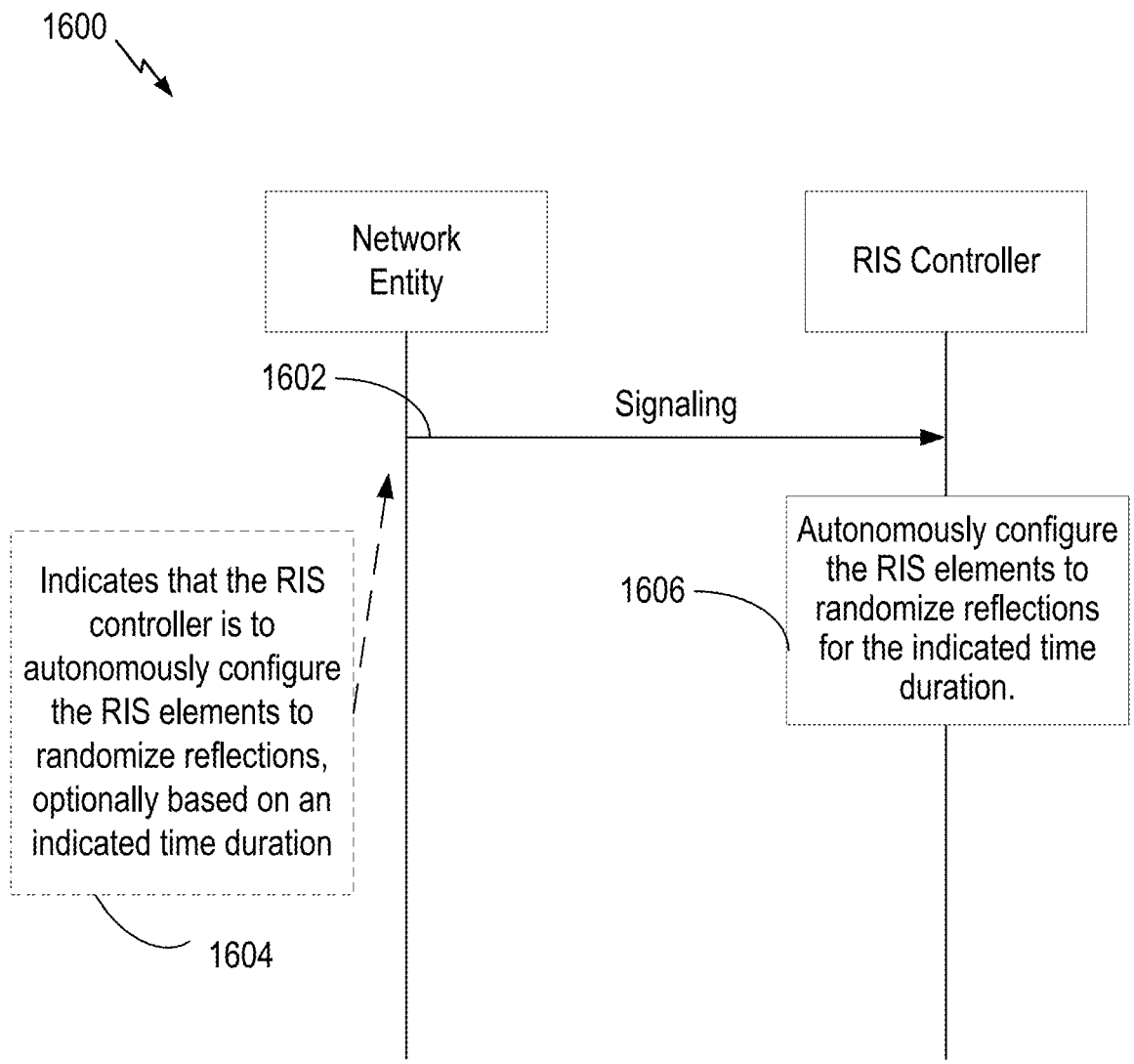
FIG. 16 depicts a call flow diagram for communications in a network between a network entity and a RIS controller, according to certain aspects of the present disclosure.

Mechanisms for applying a codebook update (signaled by a network entity such as a gNB) proposed herein may be understood with reference to the call flow diagram 1500 of FIG. 15.

As illustrated at 1502, the network entity may send or receive RIS capability signaling to or from a RIS controller. Then, at 1504, the network entity sends RIS configuration signaling to the RIS controller (e.g., using a current codebook). In some cases, the network entity may use its choice of codebook patterns to configure the RIS.

As shown at 1506, the network entity receives information from other network entities, and based in part on the information, the network entity assesses whether the RIS codebook needs updated as shown at 1508. If the RIS codebook does not need an update, the network entity does not initiate an update.

However, if the RIS codebook does need an update, the network entity will update the RIS pattern codebook as shown at 1510. At 1512, the network entity sends new RIS configuration signaling to the RIS controller using a new codebook identifier. Then, as shown at 1514, the network entity assesses whether to trigger a hop across intrinsic randomization.

In some cases, the network entity may change intrinsic randomization used in current codebook by hopping to a different codebook that has similar tradeoff. In some cases, triggering a hop across may be based on a timer. If the network entity does not need to trigger the hop across intrinsic randomization, the network entity does not proceed with a change to the intrinsic randomization. However, if the network entity does need to trigger the hop across intrinsic randomization, the network entity will change intrinsic randomization as shown at 1516. Then, as shown at 1518, the network entity sends the RIS controller a new codebook identifier. Optionally, the network entity may repeat steps 1508-1518 based on additional information from other network entities as shown at 1520.

In some cases, a codebook change/update may be triggered by a network observation that RIS configurations chosen by a network entity over a previous time window result in highly directional interference to one or more users. Here, the network entity may select a codebook with higher interference randomization capability which may result in reduced average desired signal RIS reflection gain for its served users. In other cases, a codebook change may be triggered by a network observation that there are no unintended users that can be impacted by reflections from RIS. Here, another network entity (gNB) may select a codebook with higher average desired signal RIS reflection gain for its served users but reduced interference randomization capability. Generally, the interfered (e.g., unintended) users may be served by other network entities (e.g., operating in another band and/or controlled by another network entity).

According to certain aspects, a RIS configuration codebook update may be initiated by a network entity. Specifically, the network entity may adopt certain procedures to ensure that a RIS is configured using codebook with appropriate interference randomization capability. To begin the update, the network entity may send a message to a network entity to learn the activity (e.g., on a per-frequency band basis) within the nearby area. This message may include information about the location of the RIS. The network entity may then send a message to the network entities whose services are likely to be impacted by the interference originating from RIS. Each network entity may prepare a message containing information on its served users, and may send the message to another network entity (e.g., that operates a RIS). That network entity may then determine the codebook for the RIS, which balances average desired gain and interference randomization capability. The network entity may also determine a hopping periodicity to hop among codebooks offering similar tradeoff between interference randomization and desired gain.

In higher traffic scenarios, such codebook can promote interference randomization to reduce impact of RIS-1 on other non-served users, whereas in lighter load scenarios, such codebook can promote desired gain. By implementing this codebook in high-traffic scenarios, fine timescale joint resource allocation among gNBs may not be necessary.

Aspects of the present disclosure provide certain mechanisms for configuring a RIS controller for autonomous RIS operation using intrinsic randomization. Mechanisms for autonomous RIS operation proposed herein may be understood with reference to the call flow diagram 1600 of FIG. 16.

As illustrated at 1602, a network entity sends signaling to a RIS controller. As illustrated at 1604, the network entity utilizes the signaling to indicate that the RIS controller is to autonomously configure the RIS elements to randomize reflections, optionally based on an indicated time duration. Based on the signaling, at 1606, the RIS controller autonomously configures the RIS elements to randomize reflections for the indicated time duration. Autonomous operation may allow a RIS to set its own intrinsic dither/randomization. The autonomous RIS controller need not share specific implementation details with the gNB, and may be enabled with codebooks having different intrinsic dither choices with similar interference randomization capability and average gain.

In some cases, the network entity and/or the network may signal to the RIS a grant/indication of permission that allows the RIS to operate in an autonomous intrinsic randomization/dither setting mode. The indication may also include at least one of a time duration for which the autonomous operation is valid and a hopping periodicity for changing intrinsic randomization/dither. Upon expiration of the time duration, the RIS controller may revert to applying network entity indicated settings. In some cases, the intrinsic dither may be set by the RIS controller, when such autonomous mode is enabled by the network entity. Codebooks considered for hopping may have similar interference randomization capability and average gain when, for example, codebooks are within respective margins of a common reference, whenever these margins are indicated by the network entity to the RIS controller.

In a general case, a network entity may enable a particular autonomous intrinsic randomization/dither setting mode. Each such mode may have a corresponding default codebook with a reference interference randomization capability and average gain of the RIS reflected signal in desired direction. The modes may be provided to the gNB alongside respective margins via capability information. Each mode may entail hopping across codebooks within the margins.

Example Methods

FIG. 17 shows a method 1700 for wireless communications by a first network entity, such as BS 102 of FIGS. 1 and 3.

Method 1700 begins at 1702 with receiving signaling from a second network entity to configure reconfigurable intelligent surface (RIS) elements based on a direction of a target incident signal and a direction of the target reflected signal.

Method 1700 then proceeds to step 1704 with configuring the RIS elements based on the direction of the target incident signal and to randomize reflections based on the signaling.

In one aspect, method 1700 further includes transmitting signaling, to the second network entity, indicating at least one of: multiple codebook types and associated metrics, or an indication of a type of codebook.

In one aspect, method 1700 further includes receiving signaling, from the second network entity, indicating at least one of: one of the multiple codebooks, and a codeword in the codebook to use to randomize reflections.

In one aspect, method 1700 further includes receiving additional signaling, updating a codebook selection based on the signaling, and configuring the RIS elements to randomize reflections based on the updated codebook selection.

In one aspect, the configuring comprises configuring the RIS elements to spread energy reflected from at least one the target incident signal or another incident signal across multiple non-target reflect directions.

In one aspect, the RIS elements are configured to randomize reflections from at least one of: the target incident signal, or another incident signal.

In one aspect, configuring the RIS elements to randomize reflections is based on control parameters for the RIS elements, each control parameter being one or more bits.

In one aspect, the control parameters are obtained from a randomization alphabet associated with the direction of the target incident signal and a direction of a target reflected signal.

In one aspect, the signaling indicates one or more parameters, and the first network entity configures the RIS elements to randomize reflections based on the one or more parameters.

In one aspect, the one or more parameters include at least one of: the direction of the target incident signal, a range of reflected directions, a span of reflected directions, one or more codebook sizes, or a set of interfering signal directions incident to the first network entity.

In one aspect, configuring the RIS elements to randomize reflections is based on at least one codebook, selected from a set multiple codebooks.

In one aspect, each of the multiple codebooks contains codewords for RIS element configuration, and each codebook, or codeword within a codebook, is associated one or more metrics.

In one aspect, the selection is based on a desired value for the one or more metrics.

In one aspect, the signaling from the second network entity indicates the desired value for the one or more metrics.

In one aspect, the signaling indicates the first network entity is to autonomously configure the RIS elements to randomize reflections.

In one aspect, the signaling also indicates a time duration for which the first network entity is to autonomously configure the RIS elements to randomize reflections.

In one aspect, the signaling also indicates a hopping pattern for the first network entity to use to autonomously reconfigure the RIS elements to randomize reflections.

Figure 19:
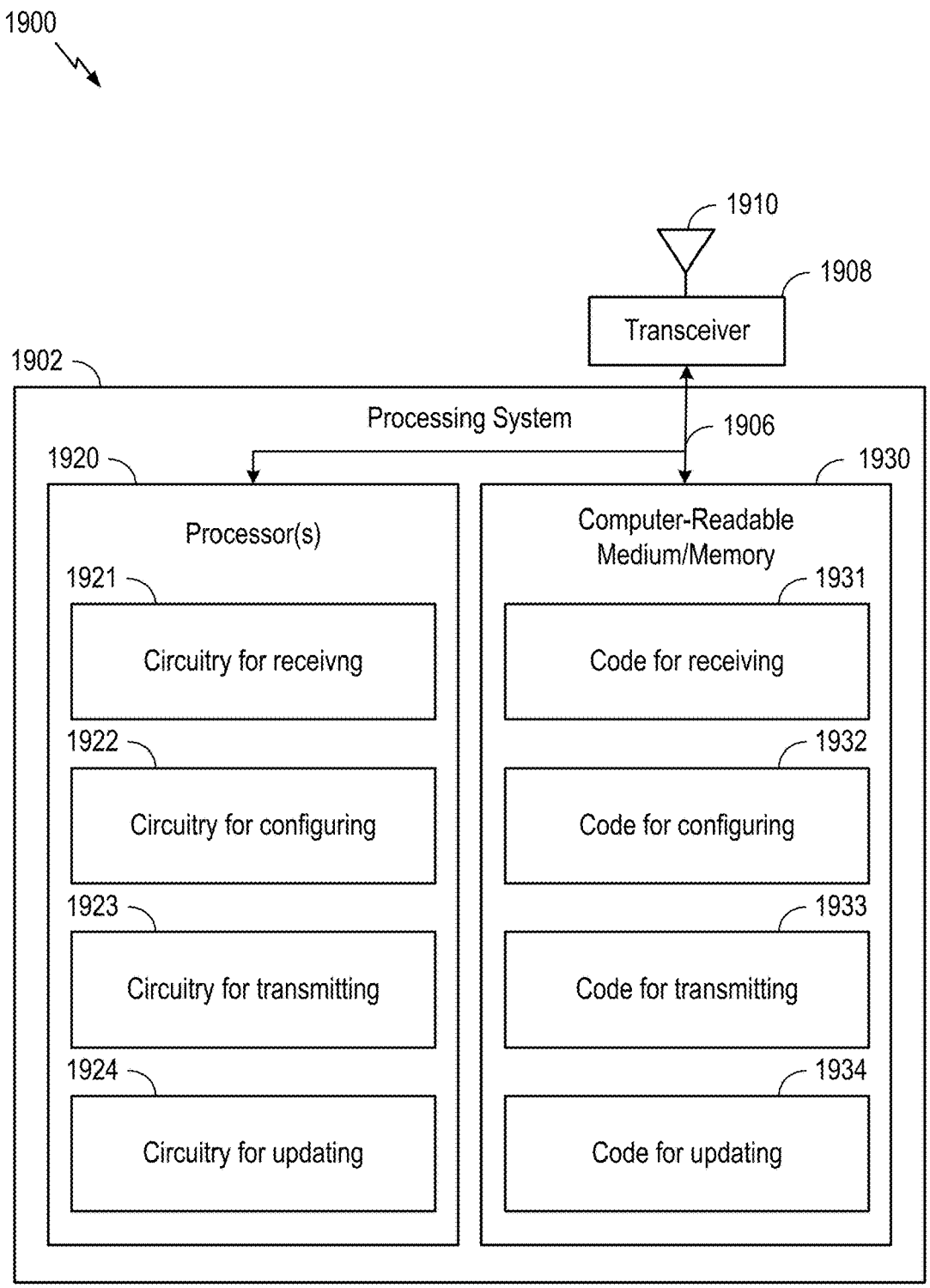
FIG. 19 depicts aspects of an example communications device.

In one aspect, method 1700, or any aspect related to it, may be performed by an apparatus, such as communications device 1900 of FIG. 19, which includes various components operable, configured, or adapted to perform the method 1700. Communications device 1900 is described below in further detail.

Note that FIG. 17 is just one example of a method, and other methods including fewer, additional, or alternative steps are possible consistent with this disclosure.

FIG. 18 shows a method 1800 for wireless communications by a network entity, such as BS 102 of FIGS. 1 and 3, or a disaggregated base station as discussed with respect to FIG. 2.

Method 1800 begins at 1802 with transmitting signaling to a first network entity to configure RIS elements, based on a direction of a target incident signal and a direction of a target reflected signal, to randomize reflections.

Method 1800 then proceeds to step 1804 with communicating with at least one user equipment (UE) via signals transmitted in the direction of the target incident signal.

In one aspect, method 1800 further includes receiving signaling, from the second network entity, indicating at least one of: multiple codebook types and associated metrics, or an indication of a type of codebook.

In one aspect, method 1800 further includes transmitting signaling, to the second network entity, indicating at least one of: one of the multiple codebooks, and a codeword in the codebook to use to randomize reflections.

In one aspect, method 1800 further includes transmitting additional signaling updating a codebook selection to randomize reflections at the second network entity.

In one aspect, method 1800 further includes receiving feedback from one or more other network entities, and selecting the at least one codebook based, at least in part, on the feedback.

In one aspect, the configuring comprises configuring the RIS elements to spread energy reflected from at least one the target incident signal or another incident signal across multiple non-target reflect directions.

In one aspect, the RIS elements are configured to randomize reflections from at least one of: the target incident signal, or another incident signal.

In one aspect, the signaling to configure RIS elements to randomize reflections is based on control parameters for the RIS elements, each control parameter being one or more bits.

In one aspect, the control parameters are obtained from a randomization alphabet associated with the direction of the target incident signal and a direction of a target reflected signal.

In one aspect, the signaling indicates at least one of: the direction of the target incident signal, a range of reflected directions, a span of reflected directions, one or more codebook sizes, or a set of interfering signal directions incident to the first network entity.

In one aspect, transmitting signaling to a second network entity to configure the RIS elements to randomize reflections is based on at least one codebook, selected from a set multiple codebooks.

In one aspect, each of the multiple codebooks contains codewords for RIS element configuration, and each codebook, or codeword within a codebook, is associated one or more metrics.

In one aspect, the selection is based on a desired value for the one or more metrics, and the signaling indicates the desired value for the one or more metrics.

In one aspect, the feedback indicates one or more services potentially impacted by interference due to reflections from the RIS elements.

In one aspect, the signaling indicates the second network entity is to autonomously configure the RIS elements to randomize reflections.

In one aspect, the signaling also indicates a time duration for which the second network entity is to autonomously configure the RIS elements to randomize reflections.

In one aspect, the signaling also indicates a hopping pattern for the second network entity to use to autonomously reconfigure the RIS elements to randomize reflections.

Figure 20:
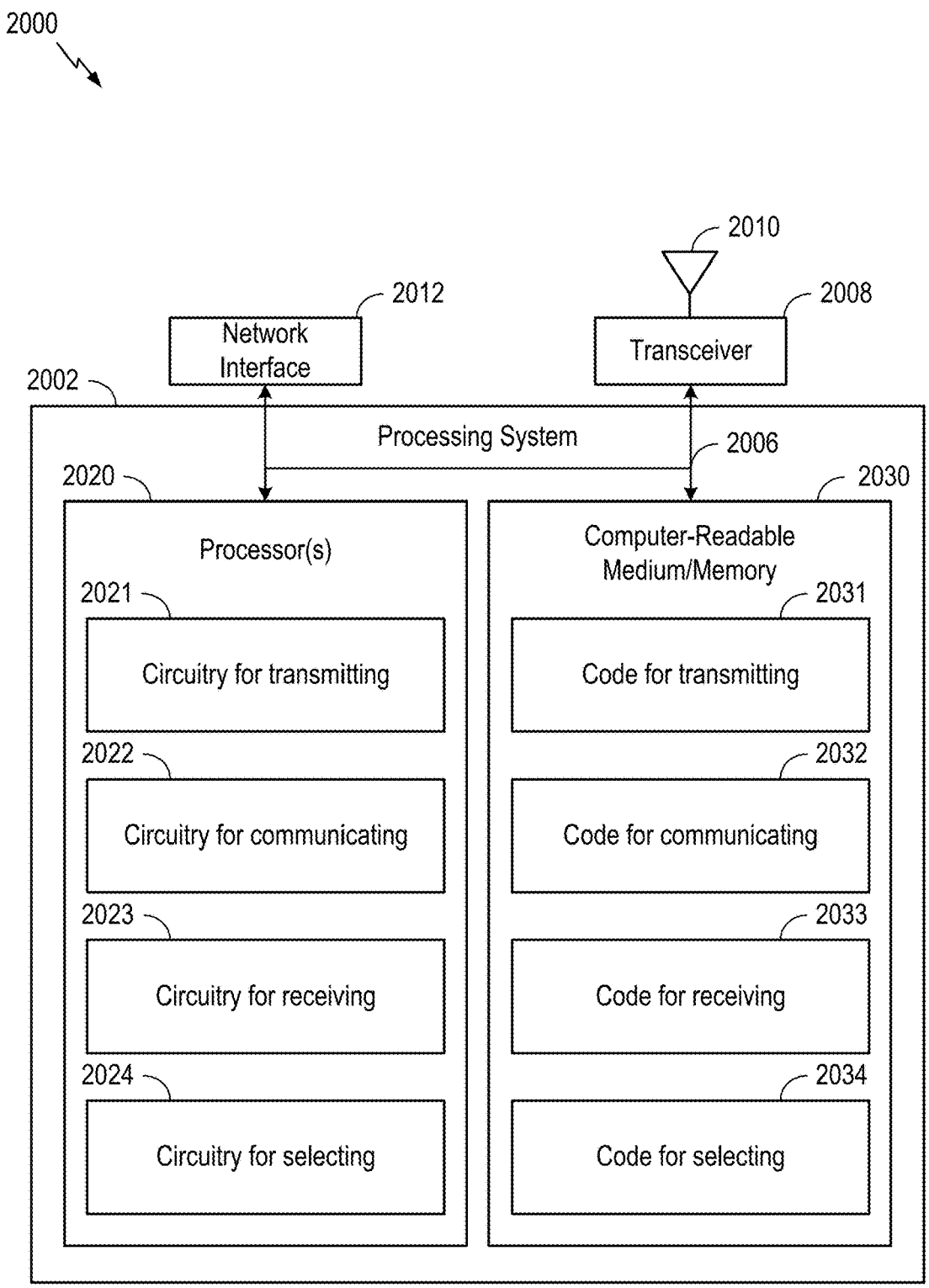
FIG. 20 depicts aspects of an example communications device.

In one aspect, method 1800, or any aspect related to it, may be performed by an apparatus, such as communications device 2000 of FIG. 20, which includes various components operable, configured, or adapted to perform the method 2000. Communications device 2000 is described below in further detail.

Note that FIG. 18 is just one example of a method, and other methods including fewer, additional, or alternative steps are possible consistent with this disclosure.

Example Communications Devices

FIG. 19 depicts aspects of an example communications device 1900. In some aspects, communications device 1900 is a network entity, such as UE 104 described above with respect to FIGS. 1 and 3.

The communications device 1900 includes a processing system 1902 coupled to a transceiver 1908 (e.g., a transmitter and/or a receiver). The transceiver 1908 is configured to transmit and receive signals for the communications device 1900 via an antenna 1910, such as the various signals as described herein. The processing system 1902 may be configured to perform processing functions for the communications device 1900, including processing signals received and/or to be transmitted by the communications device 1900.

The processing system 1902 includes one or more processors 1920. In various aspects, the one or more processors 1920 may be representative of one or more of receive processor 358, transmit processor 364, TX MIMO processor 366, and/or controller/processor 380, as described with respect to FIG. 3. The one or more processors 1920 are coupled to a computer-readable medium/memory 1930 via a bus 1906. In certain aspects, the computer-readable medium/memory 1930 is configured to store instructions (e.g., computer-executable code) that when executed by the one or more processors 1920, cause the one or more processors 1920 to perform the method 1700 described with respect to FIG. 17, or any aspect related to it. Note that reference to a processor performing a function of communications device 1900 may include one or more processors performing that function of communications device 1900.

In the depicted example, computer-readable medium/memory 1930 stores code (e.g., executable instructions) for receiving 1931, code for configuring 1932, code for transmitting 1933, and code for updating 1934. Processing of the code 1931-1934 may cause the communications device 1900 to perform the method 1700 described with respect to FIG. 17, or any aspect related to it.

The one or more processors 1920 include circuitry configured to implement (e.g., execute) the code stored in the computer-readable medium/memory 1930, including circuitry for receiving 1921, circuitry for configuring 1922, circuitry for transmitting 1923, and circuitry for updating 1924. Processing with circuitry 1921-1924 may cause the communications device 1900 to perform the method 1700 described with respect to FIG. 17, or any aspect related to it.

Various components of the communications device 1900 may provide means for performing the method 1700 described with respect to FIG. 17, or any aspect related to it. For example, means for transmitting, sending or outputting for transmission may include the transceivers 332 and/or antenna(s) 334 of the BS 102 illustrated in FIG. 3 and/or transceiver 1908 and antenna 1910 of the communications device 1900 in FIG. 19. Means for receiving or obtaining may include the transceivers 332 and/or antenna(s) 334 of the BS 102 illustrated in FIG. 3 and/or transceiver 1908 and antenna 1910 of the communications device 1900 in FIG. 19.

FIG. 20 depicts aspects of an example communications device. In some aspects, communications device 2000 is a network entity, such as BS 102 of FIGS. 1 and 3, or a disaggregated base station as discussed with respect to FIG. 2.

The communications device 2000 includes a processing system 2002 coupled to a transceiver 2008 (e.g., a transmitter and/or a receiver) and/or a network interface 2012. The transceiver 2008 is configured to transmit and receive signals for the communications device 2000 via an antenna 2010, such as the various signals as described herein. The network interface 2012 is configured to obtain and send signals for the communications device 2000 via communications link(s), such as a backhaul link, midhaul link, and/or fronthaul link as described herein, such as with respect to FIG. 2. The processing system 2002 may be configured to perform processing functions for the communications device 2000, including processing signals received and/or to be transmitted by the communications device 2000.

The processing system 2002 includes one or more processors 2020. In various aspects, one or more processors 2020 may be representative of one or more of receive processor 338, transmit processor 320, TX MIMO processor 330, and/or controller/processor 340, as described with respect to FIG. 3. The one or more processors 2020 are coupled to a computer-readable medium/memory 2030 via a bus 2006. In certain aspects, the computer-readable medium/memory 2030 is configured to store instructions (e.g., computer-executable code) that when executed by the one or more processors 2020, cause the one or more processors 2020 to perform the method 1800 described with respect to FIG. 18, or any aspect related to it. Note that reference to a processor of communications device 2000 performing a function may include one or more processors of communications device 2000 performing that function.

In the depicted example, the computer-readable medium/memory 2030 stores code (e.g., executable instructions) for transmitting 2031, code for communicating 2032, code for receiving 2033, and code for selecting 2034. Processing of the code 2031-2034 may cause the communications device 2000 to perform the method 1800 described with respect to FIG. 18, or any aspect related to it.

The one or more processors 2020 include circuitry configured to implement (e.g., execute) the code stored in the computer-readable medium/memory 2030, including circuitry for transmitting 2021, circuitry for communicating 2022, circuitry for receiving 2023, and circuitry for selecting 2024. Processing with circuitry 2021-2024 may cause the communications device 2000 to perform the method 1800 as described with respect to FIG. 18, or any aspect related to it.

Various components of the communications device 2000 may provide means for performing the method 1800 as described with respect to FIG. 18, or any aspect related to it. Means for transmitting, sending or outputting for transmission may include the transceivers 332 and/or antenna(s) 334 of the BS 102 illustrated in FIG. 3 and/or transceiver 2008 and antenna 2010 of the communications device 2000 in FIG. 20. Means for receiving or obtaining may include the transceivers 332 and/or antenna(s) 334 of the BS 102 illustrated in FIG. 3 and/or transceiver 2008 and antenna 2010 of the communications device 2000 in FIG. 20.

Example Clauses

Implementation examples are described in the following numbered clauses:

Clause 1: A method for wireless communication by a first network entity, comprising: receiving signaling from a second network entity to configure reconfigurable intelligent surface (RIS) elements based on a direction of a target incident signal; and configuring the RIS elements based on the direction of the target incident signal and to randomize reflections based on the signaling.

Clause 2: The method of clause 1, wherein the configuring comprises configuring the RIS elements to spread energy reflected from at least one of the target incident signal or another incident signal across multiple non-target reflect directions.

Clause 3: The method of clause 1, wherein the RIS elements are configured to randomize reflections from at least one of: the target incident signal; or another incident signal.

Clause 4: The method of any one of clauses 1-3, wherein configuring the RIS elements to randomize reflections is based on control parameters for the RIS elements, each control parameter being one or more bits.

Clause 5: The method of clause 4, wherein the control parameters are obtained from a randomization alphabet associated with the direction of the target incident signal and a direction of a target reflected signal.

Clause 6: The method of any one of clauses 1-5, wherein: the signaling indicates one or more parameters; and the first network entity configures the RIS elements to randomize reflections based on the one or more parameters.

Clause 7: The method of clause 6, wherein the one or more parameters include at least one of: the direction of the target incident signal, a range of reflected directions, a span of reflected directions, one or more codebook sizes, or a set of interfering signal directions incident to the first network entity.

Clause 8: The method of any one of clauses 1-7, wherein configuring the RIS elements to randomize reflections is based on at least one codebook, selected from a set multiple codebooks.

Clause 9: The method of clause 8, wherein: each of the multiple codebooks contains codewords for RIS element configuration; and each codebook, or codeword within a codebook, is associated one or more metrics.

Clause 10: The method of clause 9, wherein the selection is based on a desired value for the one or more metrics.

Clause 11: The method of clause 10, wherein the signaling from the second network entity indicates the desired value for the one or more metrics.

Clause 12: The method of any one of clauses 8-11, further comprising transmitting signaling, to the second network entity, indicating at least one of: multiple codebook types and associated metrics; or an indication of a type of codebook.

Clause 13: The method of any one of clauses 8-12, further comprising receiving signaling, from the second network entity, indicating at least one of: one of the multiple codebooks; and a codeword in the that codebook to use to randomize reflections.

Clause 14: The method of any one of clauses 8-13, further comprising: receiving additional signaling; updating a codebook selection based on the signaling; and configuring the RIS elements to randomize reflections based on the updated codebook selection.

Clause 15: The method of any one of clauses 1-14, wherein the signaling indicates the first network entity is to autonomously configure the RIS elements to randomize reflections.

Clause 16: The method of clause 15, wherein the signaling also indicates a time duration for which the first network entity is to autonomously configure the RIS elements to randomize reflections.

Clause 17: The method of any one of clauses 15-16, wherein the signaling also indicates a hopping pattern for the first network entity to use to autonomously reconfigure the RIS elements to randomize reflections.

Clause 18: A method for wireless communication by a second network entity, comprising: transmitting signaling to a first network entity to configure reconfigurable intelligent surface (RIS) elements, based on a direction of a target incident signal, to randomize reflections; and communicating with at least one user equipment (UE) via signals transmitted in the direction of the target incident signal.

Clause 19: The method of clause 8, wherein the configuring comprises configuring the RIS elements to spread energy reflected from at least one of the target incident signal or another incident signal across multiple non-target reflect directions.

Clause 20: The method of clause 19, wherein the RIS elements are configured to randomize reflections from at least one of: the target incident signal; or another incident signal.

Clause 21; The method of any one of clauses 19-20, wherein the signaling to configure RIS elements to randomize reflections is based on control parameters for the RIS elements, each control parameter being one or more bits.

Clause 22: The method of clause 21, wherein the control parameters are obtained from a randomization alphabet associated with the direction of the target incident signal and a direction of a target reflected signal.

Clause 23: The method of any one of clauses 19-22, wherein the signaling indicates at least one of: the direction of the target incident signal, a range of reflected directions, a span of reflected directions, one or more codebook sizes, or a set of interfering signal directions incident to the first network entity.

Clause 24: The method of any one of clauses 19-23, wherein transmitting signaling to a second network entity to configure the RIS elements to randomize reflections is based on at least one codebook, selected from a set multiple codebooks.

Clause 25: The method of clause 24, wherein: each of the multiple codebooks contains codewords for RIS element configuration; and each codebook, or codeword within a codebook, is associated one or more metrics.

Clause 26: The method of clause 25, wherein: the selection is based on a desired value for the one or more metrics; and the signaling indicates the desired value for the one or more metrics.

Clause 27: The method of any one of clauses 24-26, further comprising receiving signaling, from the second network entity, indicating at least one of: multiple codebook types and associated metrics; or an indication of a type of codebook.

Clause 28; The method of any one of clauses 24-27, further comprising transmitting signaling, to the second network entity, indicating at least one of: one of the multiple codebooks; and a codeword in the codebook to use to randomize reflections.

Clause 29: The method of any one of clauses 24-28, further comprising: transmitting additional signaling updating a codebook selection to randomize reflections at the second network entity.

Clause 30: The method of any one of clauses 24-29, further comprising: receiving feedback from one or more other network entities; and selecting the at least one codebook based, at least in part, on the feedback.

Clause 31: The method of clause 30, wherein the feedback indicates one or more services potentially impacted by interference due to reflections from the RIS elements.

Clause 32: The method of any one of clauses 18-31, wherein the signaling indicates the second network entity is to autonomously configure the RIS elements to randomize reflections.

Clause 33: The method of clause 32, wherein the signaling also indicates a time duration for which the second network entity is to autonomously configure the RIS elements to randomize reflections.

Clause 34: The method of any one of clauses 32-33, wherein the signaling also indicates a hopping pattern for the second network entity to use to autonomously reconfigure the RIS elements to randomize reflections.

Clause 35: An apparatus, comprising: a memory comprising executable instructions; and a processor configured to execute the executable instructions and cause the apparatus to perform a method in accordance with any one of Clauses 1-34.

Clause 36: An apparatus, comprising means for performing a method in accordance with any one of Clauses 1-34.

Clause 37: A non-transitory computer-readable medium comprising executable instructions that, when executed by a processor of an apparatus, cause the apparatus to perform a method in accordance with any one of Clauses 1-34.

Clause 38: A computer program product embodied on a computer-readable storage medium comprising code for performing a method in accordance with any one of Clauses 1-34.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the phrases "according to" and "based on" generally mean "in conformity with" and/or "depending on" and such phrases may be used interchangeably.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication at a first network entity, comprising: a memory comprising computer-executable instructions; and one or more processors configured to execute the computer-executable instructions and cause the apparatus to:
    receive signaling from a second network entity to configure reconfigurable intelligent surface (RIS) elements based on a direction of a target incident signal and a direction of a target reflected signal; and
    configure the RIS elements based on the direction of the target incident signal and the direction of the target reflected signal and to randomize reflections, based on the signaling.

2. The apparatus of claim 1, wherein the configuring comprises configuring the RIS elements to spread energy reflected from at least one of the target incident signal or another incident signal across multiple non-target reflect directions.

3. The apparatus of claim 1, wherein the RIS elements are configured to randomize reflections from at least one of:
    the target incident signal; or
    another incident signal.

4. The apparatus of claim 1, wherein configuring the RIS elements to randomize reflections is based on control parameters for the RIS elements, each control parameter being one or more bits.

5. The apparatus of claim 4, wherein the control parameters are obtained from a randomization alphabet associated with the direction of the target incident signal and a direction of a target reflected signal.

6. The apparatus of claim 1, wherein:
    the signaling indicates one or more parameters; and
    the first network entity configures the RIS elements to randomize reflections based on the one or more parameters.

7. The apparatus of claim 6, wherein the one or more parameters include at least one of: the direction of the target incident signal, a range of reflected directions, a span of reflected directions, one or more codebook sizes, or a set of interfering signal directions incident to the first network entity.

8. The apparatus of claim 1, wherein configuring the RIS elements to randomize reflections is based on at least one codebook, selected from a set of multiple codebooks.

9. The apparatus of claim 8, wherein:
each of the set of the multiple codebooks contains codewords for RIS element configuration; and
each codebook, or codeword within a codebook, is associated with one or more metrics.

10. The apparatus of claim 9, wherein the selection is based on a desired value for the one or more metrics.

11. The apparatus of claim 10, wherein the signaling from the second network entity indicates the desired value for the one or more metrics.

12. The apparatus of claim 8, wherein the one or more processors are further configured to execute the instructions and cause the apparatus to:
transmit signaling, to the second network entity, indicating at least one of:
multiple codebook types and associated metrics; or
an indication of a type of codebook.

13. The apparatus of claim 8, wherein the one or more processors are further configured to execute the instructions and cause the apparatus to:
receive signaling, from the second network entity, indicating at least one of:
one of the set of the multiple codebooks; and
a codeword in the codebook to use to randomize reflections.

14. The apparatus of claim 8, wherein the one or more processors are further configured to execute the instructions and cause the apparatus to::
receive additional signaling;
update a codebook election based on the signaling; and
configure the RIS elements to randomize reflections based on the updated codebook selection.

15. The apparatus of claim 1, wherein the signaling indicates the first network entity is to autonomously configure the RIS elements to randomize reflections.

16. The apparatus of claim 15, wherein the signaling also indicates a time duration for which the first network entity is to autonomously configure the RIS elements to randomize reflections.

17. The apparatus of claim 15, wherein the signaling also indicates a hopping pattern for the first network entity to use to autonomously reconfigure the RIS elements to randomize reflections.

18. An apparatus for wireless communication at a second network entity, comprising: a memory comprising computer-executable instructions; and one or more processors configured to execute the computer-executable instructions and cause the apparatus to:
transmit signaling to a first network entity to configure reconfigurable intelligent surface (RIS) elements, based on a direction of a target incident signal and a direction of a target reflected signal, to randomize reflections; and
communicate with at least one user equipment (UE) via signals transmitted in the direction of the target incident signal and the direction of the target reflected signal.

19. The apparatus of claim 18, wherein the configuring comprises configuring the RIS elements to spread energy reflected from at least one of the target incident signal or another incident signal across multiple non-target reflect directions.

20. The apparatus of claim 18, wherein the RIS elements are configured to randomize reflections from at least one of:
the target incident signal; or
another incident signal.

21. The apparatus of claim 18, wherein the signaling to configure RIS elements to randomize reflections is based on control parameters for the RIS elements, each control parameter being one or more bits.

22. The apparatus of claim 21, wherein the control parameters are obtained from a randomization alphabet associated with the direction of the target incident signal and a direction of a target reflected signal.

23. The apparatus of claim 18, wherein the signaling indicates at least one of: the direction of the target incident signal, a range of reflected directions, a span of reflected directions, one or more codebook sizes, or a set of interfering signal directions incident to the first network entity.

24. The apparatus of claim 18, wherein transmitting signaling to a second network entity to configure the RIS elements to randomize reflections is based on at least one codebook, selected from a set of multiple codebooks.

25. The apparatus of claim 24, wherein:
each of the set of the multiple codebooks contains codewords for RIS element configuration; and
each codebook, or codeword within a codebook, is associated with one or more metrics.

26. The apparatus of claim 25, wherein:
the selection is based on a desired value for the one or more metrics; and
the signaling indicates the desired value for the one or more metrics.

27. The apparatus of claim 24, wherein the one or more processors are further configured to execute the instructions and cause the apparatus to:
receive feedback from one or more other network entities; and
select the at least one codebook based, at least in part, on the feedback.

28. The apparatus of claim 27, wherein the feedback indicates one or more services potentially impacted by interference due to reflections from the RIS elements.

29. A method for wireless communication at a first wireless entity, comprising:
receiving signaling from a second network entity to configure reconfigurable intelligent surface (RIS) elements based on a direction of a target incident signal and a direction of a target reflected signal; and
configuring the RIS elements based on the direction of the target incident signal and the direction of the target reflected signal and to randomize reflections, based on the signaling.

30. A method for wireless communication at a second network entity, comprising:
transmitting signaling to a first network entity to configure reconfigurable intelligent surface (RIS) elements, based on a direction of a target incident signal and a direction of a target reflected signal, to randomize reflections; and
communicating with at least one user equipment (UE) via signals transmitted in the direction of the target incident signal and the direction of the target reflected signal.

* * * * *